US012727020B2

(12) United States Patent
Song et al.

(10) Patent No.: US 12,727,020 B2
(45) Date of Patent: Sep. 1, 2026

(54) METHOD AND ELECTRONIC DEVICE FOR DETERMINING SCHEDULING PRIORITY OF USER EQUIPMENT

(71) Applicant: SAMSUNG ELECTRONICS CO., LTD., Suwon-si (KR)

(72) Inventors: Juhwan Song, Suwon-si (KR); Yujin Nam, Suwon-si (KR); Seungyeon Lee, Suwon-si (KR); Seowoo Jang, Suwon-si (KR); Minsuk Choi, Suwon-si (KR); Jongwoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 540 days.

(21) Appl. No.: 18/143,980

(22) Filed: May 5, 2023

(65) Prior Publication Data

US 2023/0362976 A1 Nov. 9, 2023

Related U.S. Application Data

(63) Continuation of application No. PCT/KR2023/006044, filed on May 3, 2023.

(30) Foreign Application Priority Data

May 6, 2022 (KR) ........................ 10-2022-0056246
Sep. 23, 2022 (KR) ........................ 10-2022-0121031

(51) Int. Cl.
*H04W 72/566* (2023.01)
*H04W 72/1263* (2023.01)
(Continued)

(52) U.S. Cl.
CPC ..... *H04W 72/566* (2023.01); *H04W 72/1263* (2013.01); *H04W 72/535* (2023.01); *H04W 72/542* (2023.01)

(58) Field of Classification Search
CPC ............. H04W 72/566; H04W 72/542; H04W 72/535; H04W 72/1263
See application file for complete search history.

(56) References Cited

U.S. PATENT DOCUMENTS 11,349,679 B1 * 5/2022 Laird-McConnell ........................ G06Q 10/1093
11,632,788 B2 4/2023 Li et al.
(Continued)

FOREIGN PATENT DOCUMENTS

CN 112888076 A 6/2021
KR 10-2022-0009308 A 1/2022
(Continued)

OTHER PUBLICATIONS

Tian Bu et al., "Generalized Proportional Fair Scheduling in Third Generation Wireless Data Networks", IEEE International Conference on Computer Communications (Infocom), Apr. 2006, 12 Pages.

(Continued)

*Primary Examiner* — Sulaiman Nooristany
(74) *Attorney, Agent, or Firm* — Sughrue Mion, PLLC

(57) ABSTRACT

A method, performed by an electronic device communicating with one or more user equipments (UEs), includes: identifying one or more measurement indicators for a first UE communicating with the electronic device in a first time section; generating a first heatmap for the first time section, based on the one or more measurement indicators for the first UE; calculating one or more scheduling parameters based on the first heatmap by using at least one neural network model; and determining, based on the one or more scheduling parameters, scheduling priorities for the one or more UEs.

18 Claims, 14 Drawing Sheets

(51) Int. Cl.

| | |
|---|---|
| ***H04W 72/50*** | (2023.01) |
| ***H04W 72/542*** | (2023.01) |

(56) References Cited

U.S. PATENT DOCUMENTS

| | | | |
|---|---|---|---|
| 2015/0119068 | A1 | 4/2015 | Kudekar et al. |
| 2020/0037233 | A1 | 1/2020 | Taneja et al. |
| 2020/0236690 | A1 | 7/2020 | Mitola, III et al. |
| 2020/0296741 | A1 | 9/2020 | Ayala Romero et al. |
| 2021/0184744 | A1 | 6/2021 | Pezeshki et al. |
| 2021/0243772 | A1 | 8/2021 | Xu |
| 2022/0104213 | A1 | 3/2022 | Song et al. |
| 2022/0131764 | A1 | 4/2022 | Lee et al. |
| 2022/0369332 | A1 | 11/2022 | Wang et al. |

FOREIGN PATENT DOCUMENTS

| | | | |
|---|---|---|---|
| KR | 10-2022-0042927 | A | 4/2022 |
| KR | 10-2022-0055363 | A | 5/2022 |
| WO | 2022065622 | A1 | 3/2022 |
| WO | 2022/070363 | A1 | 4/2022 |

OTHER PUBLICATIONS

Juhwan Song et al., “Adaptive Generalized Proportional Fair Scheduling with Deep Reinforcement Learning”, IEEE Global Communications Conference (Globecom), Dec. 2022, 7 Pages.

Communication dated May 15, 2025, issued by the European Patent Office in counterpart European Application No. 23799677.2.

Semov et al., “Adaptive Resource Scheduling based on Neural Network and Mobile Traffic Prediction”, IEEE, 42nd International Conference on Telecommunications and Signal Processing (TSP), Jul. 1, 2019, pp. 585-588, XP033579830.

International Search Report (PCT/ISA/220 and PCT/ISA/210) dated Jul. 24, 2023 issued by the International Searching Authority in counterpart International Application No. PCT/KR2023/006044.

Madyan Alsenwi et al., “Radio Resource Allocation in 5G New Radio: A Neural Networks Based Approach,” arXiv:1911.05294, Computer Science > Networking and Internet Architecture, Nov. 13, 2019; (8 total pages).

Jian Wang et al., “Deep Reinforcement Learning for Scheduling in Cellular Networks,” arXiv:1905.05914v2, Jul. 23, 2019; (7 total pages).

Samuel O. Aramide et al., , “Generalized proportional fair (GPF) scheduler for LTE-A,” DOI: 10.1109/CEEC.2017.8101612, IEE, 2017 9th Computer Science and Electronic Engineering (CEEC), Nov. 9, 2017; 7 total pages.

* cited by examiner

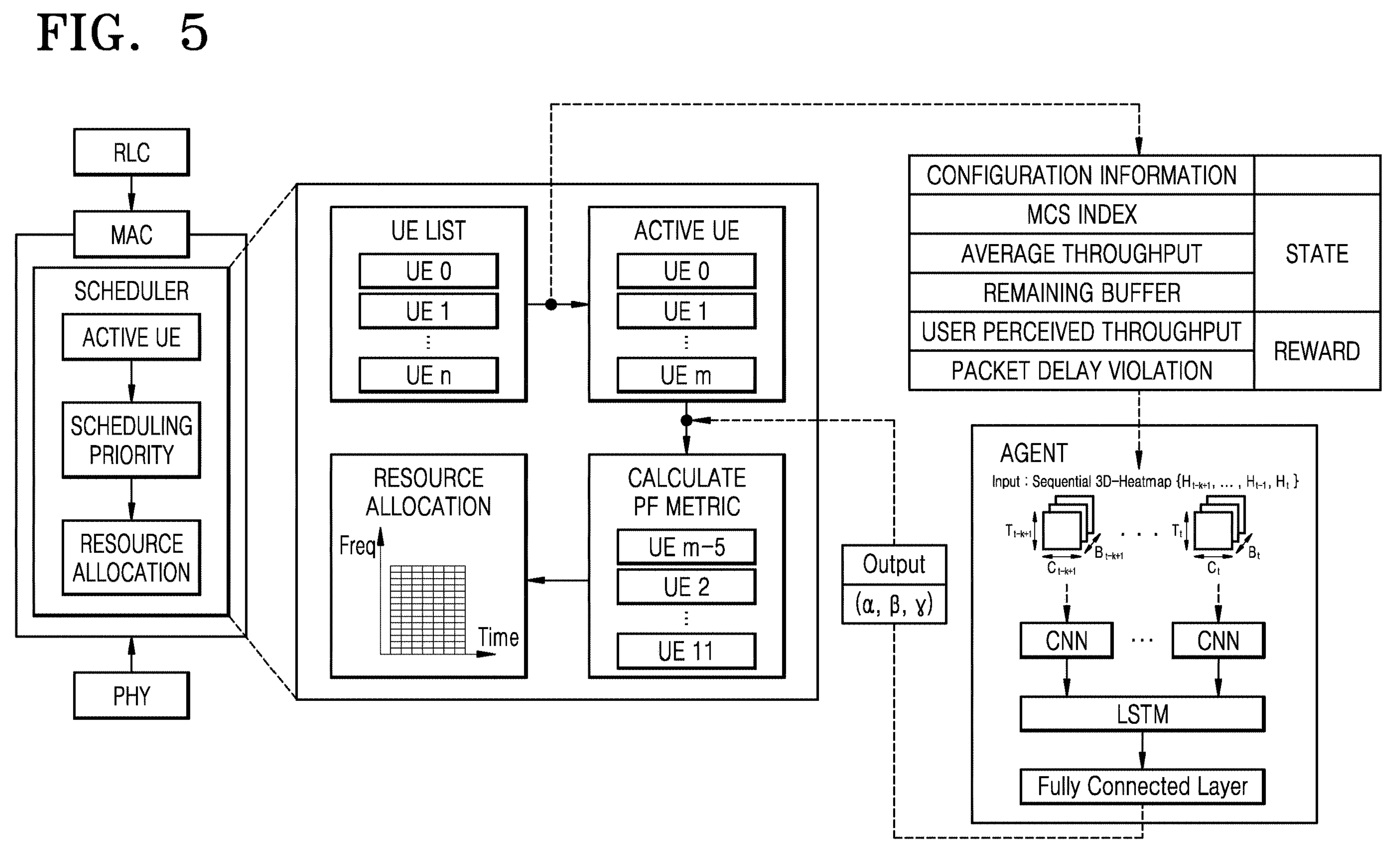
FIG. 5
RLC
MAC
SCHEDULER
ACTIVE UE
SCHEDULING PRIORITY
RESOURCE ALLOCATION
PHY
UE LIST
UE 0
UE 1
UE n
ACTIVE UE
UE 0
UE 1
UE m
RESOURCE ALLOCATION
Freq
Time
CALCULATE PF METRIC
UE m−5
UE 2
UE 11
Output
(α, β, γ)
CONFIGURATION INFORMATION
MCS INDEX
AVERAGE THROUGHPUT
REMAINING BUFFER
STATE
USER PERCEIVED THROUGHPUT
PACKET DELAY VIOLATION
REWARD
AGENT
Input : Sequential 3D-Heatmap {H_{t-k+1}, ..., H_{t-1}, H_t}
CNN
CNN
LSTM
Fully Connected Layer 710
concatenate
Attention
LSTM
LSTM
LSTM
Conv 3
Conv 2
Conv 1
$T_{t-k+1}$
$B_{t-k+1}$
$C_{t-k+1}$
$H_{t-k+1}$
$T_{t-1}$
$B_{t-1}$
$C_{t-1}$
$H_{t-1}$
$T_t$
$B_t$
$C_t$
$H_t$
alpha
beta
gamma
720
FCN
LSTM
constant

METHOD AND ELECTRONIC DEVICE FOR DETERMINING SCHEDULING PRIORITY OF USER EQUIPMENT

CROSS-REFERENCE TO RELATED APPLICATIONS

This application is a by-pass continuation application of International Application No. PCT/KR2023/006044, filed on May 3, 2023, which is based on and claims priority to Korean Patent Application Nos. 10-2022-0056246, filed on May 6, 2022, and 10-2022-0121031, filed on Sep. 23, 2022, in the Korean Intellectual Property Office, the disclosures of which are incorporated by reference herein their entireties.

BACKGROUND

1. Field

The disclosure relates to a method and an electronic device for determining a scheduling priority of a user equipment (UE).

2. Description of Related Art

With the advancements in communication technology, users are able to perform various types of tasks by communicating with a base station via user equipments (UEs). For example, users may transmit or receive voice messages or text messages, play music or video, or use the Internet by using their own UEs.

An electronic device, such as a base station, may receive requests for allocation of radio resources to a plurality of tasks from a plurality of UEs in the same time. The requests may be transmitted to the base station in the form of packets, and priorities of packets related to the requests may be determined according to types of tasks or UEs in order to provide fair and smooth services to users. The base station may sequentially allocate radio resources for the packets based on their priorities, and each UE may be allocated a radio resource to provide a corresponding service to a user.

A neural network model of artificial intelligence may be used in a medium access control (MAC) scheduler in a telecommunication system. In general, the neural network model may receive fixed-sized inputs about all active user equipments (UEs) in the telecommunication system.

SUMMARY

The disclosure may be implemented in various forms, including a method, a system, a device, or a computer program stored in a computer-readable storage medium.

According to an aspect of the disclosure, a method, performed by an electronic device communicating with one or more user equipments (UEs), includes: identifying one or more measurement indicators for a first UE communicating with the electronic device in a first time section; generating a first heatmap for the first time section, based on the one or more measurement indicators for the first UE; calculating one or more scheduling parameters based on the first heatmap by using at least one neural network model; and determining, based on the one or more scheduling parameters, scheduling priorities for the one or more UEs.

According to another aspect of the disclosure, an electronic device communicating with one or more user equipments (UEs), the electronic device includes: a memory storing one or more instructions; and at least one processor configured to execute the one or more instructions stored in the memory to: identify one or more measurement indicators for a first UE communicating with the electronic device in a first time section, generate a first heatmap for the first time section, based on the one or more measurement indicators for the first UE, calculate one or more scheduling parameters based on the first heatmap by using at least one neural network model, and determine, based on the one or more scheduling parameters, scheduling priorities for the one or more UEs.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates an example in which an electronic device performs resource allocation, according to an embodiment of the disclosure;

DETAILED DESCRIPTION

Figure 1:
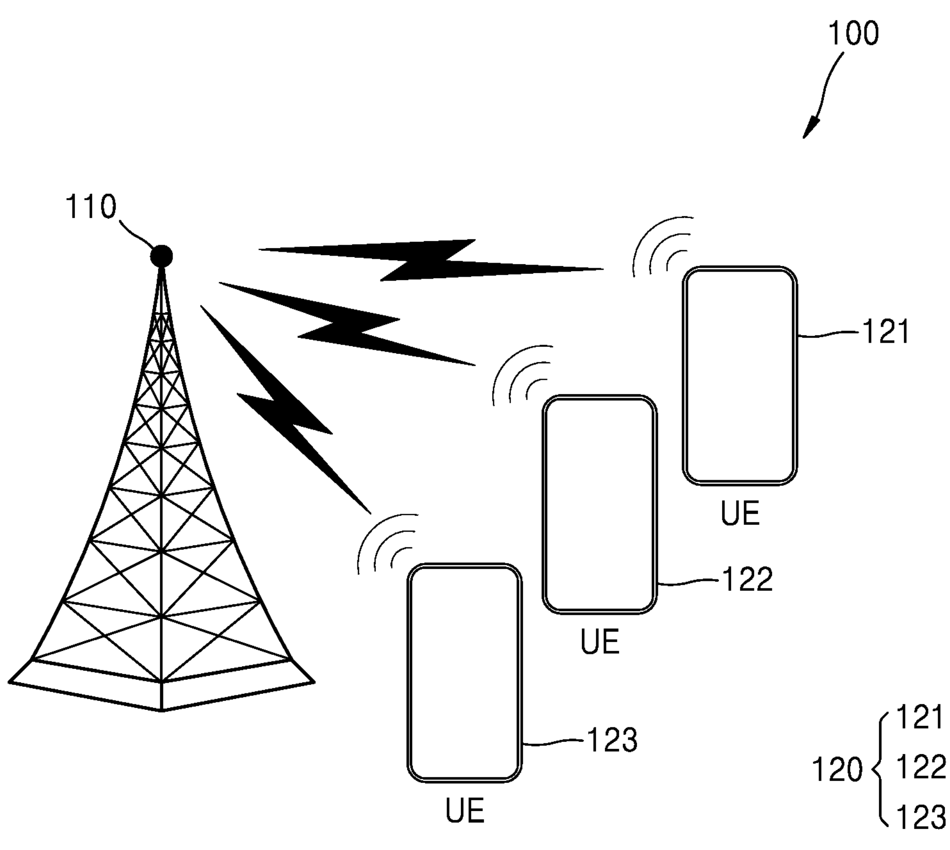
FIG. 1 illustrates a communication system including a base station and a plurality of user equipments (UEs), according to an embodiment of the disclosure.

Throughout the disclosure, the expression “at least one of a, b or c” indicates only a, only b, only c, both a and b, both a and c, both b and c, all of a, b, and c, or variations thereof.

Embodiments of the disclosure will now be described more fully hereinafter with reference to the accompanying drawings so that they may be easily implemented by one of ordinary skill in the art. However, embodiments of the disclosure may have different forms and should not be construed as being limited to embodiments set forth herein.

In this specification, a 'time section' may refer to a time interval between an arbitrary start time point and an arbitrary end time point. In an embodiment of the disclosure, a first time section and a second time section may have different start time points and different end time points. In an embodiment of the disclosure, the first and second time sections may have an equal time length or different time lengths. In an embodiment of the disclosure, a start time point and an end time point of a time section may be the same time point. In this case, the time section may refer to a time point (i.e., a start time point and an end time point).

In this specification, 'from time point A to time point B' and 'between time point A and time point B' may indicate a time section including at least one of time point A or B. In an embodiment of the disclosure, 'between time point A and time point B' may refer to a time section between time points A and B excluding both time points A and B.

In this specification, a 'user equipment (UE) associated with an electronic device' may refer to a UE associated with (or communicated with) at least one cell of the electronic device. For example, a UE associated with (or communicated with) an electronic device may include a UE located within a range of signals from the electronic device, a UE capable of being recognized by the electronic device, a UE capable of transmitting and receiving data to and from the electronic device, a UE allocated resources by the electronic device, a UE requesting resource allocation from the electronic device, and/or a UE connected to the electronic device or attempting to connect thereto. In an embodiment, a base station may be an example of the electronic device. In an embodiment, a server may be an example of the electronic device.

As used herein, buffer occupancy (BO) may correspond to a BO rate and a remaining buffer. According to an embodiment of the disclosure, BO indicates a degree to which data occupies a buffer of a radio bearer for each of a plurality of UEs, and may be information generated by each of the plurality of UEs and reported to the base station. In addition, the BO may mean the amount of data that each UE is currently attempting to transmit. For example, the BO may increase when a plurality of new packets are obtained from each UE, and may decrease when radio resources are allocated and processed for at least some of the plurality of packets.

As used herein, the terms "first" or "second" is only used to distinguish one element from another element and may not indicate the order of the elements.

Hereinafter, the disclosure is described in detail with reference to the accompanying drawings.

FIG. 1 shows a communication system including a base station and a plurality of UEs, according to an embodiment of the disclosure.

Referring to FIG. 1, a communication system 100 may include a base station 110 and a plurality of UEs 120, i.e., UEs 121, 122, and 123. As shown in FIG. 1, the communication system 100 may be configured as a cellular network in which the plurality of UEs 120 are connected to one base station 110, but is not limited thereto. Also, the number of the plurality of UEs 120 included in the communication system 100 is not limited to that shown in FIG. 1.

According to an embodiment of the disclosure, a plurality of UEs 120 may be connected to the base station 110 to request allocation of radio resources from the base station 110, and in response to the request, the base station 110 may allocate radio resources to the plurality of UEs 120. In one and more embodiments of the disclosure, radio resources may be understood as frequency resources for wireless communication as limited resources that may be shared by only a limited number of users at a certain time.

In an embodiment of the disclosure, a radio resource may be a resource block (RB) in wireless communication using an orthogonal frequency division multiplexing (OFDM) scheme. For example, the total system bandwidth may be quantized to RBs, each RB being the basic unit of resource allocation in a single time slot. The number of RBs may be determined by communication numerology and the system bandwidth.

According to an embodiment of the disclosure, the plurality of UEs 120 may request the base station 110 to allocate radio resources for performing various tasks. For example, the UE 121 may request allocation of radio resources for using the Internet, the UE 122 may request allocation of radio resources for placing voice calls, and the UE 123 may request allocation of radio resources for streaming videos. In an embodiment of the disclosure, when the plurality of UEs 120 request allocation of radio resources at the same time point in order to perform various tasks, the base station 110 may obtain a plurality of packets for the requests and set priorities for the plurality of packets. For example, the base station 110 may set the request from the UE 123 to have a higher priority than the request from the UE 121, and the request from the UE 122 to have a higher priority than the request from the UE 123. The base station 110 may sequentially allocate radio resources to the plurality of packets according to the set priorities, and the plurality of UEs 120 may perform tasks based on the allocated radio resources.

Figure 2:
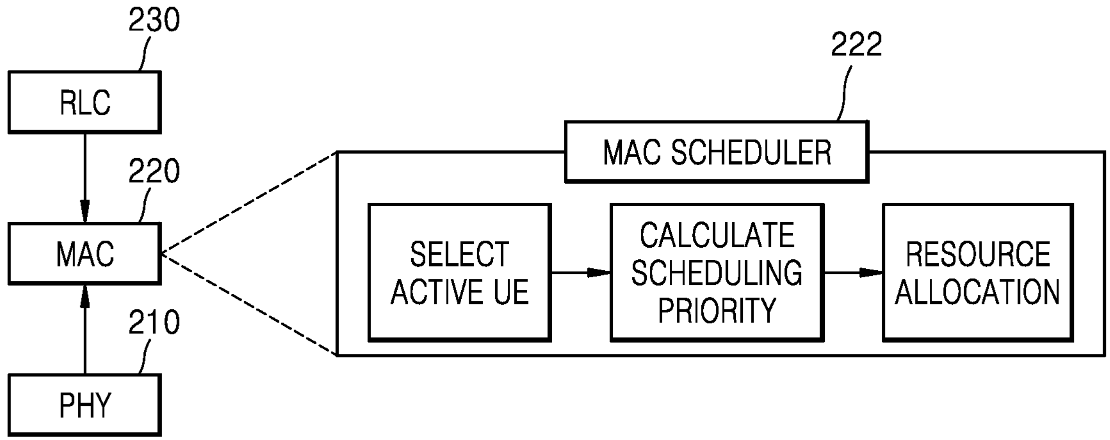
FIG. 2 illustrates layers of a base station according to an embodiment of the disclosure.

FIG. 2 is a diagram illustrating layers of a base station according to an embodiment of the disclosure.

Referring to FIG. 2, a base station (e.g., 110 of FIG. 1) may include a physical (PHY) layer 210, a medium access control (MAC) layer 220, and a radio link control (RLC) layer 230. In an embodiment of the disclosure, the PHY layer 210 is a layer responsible for direct data transmission and reception between the base station 110 and a plurality of UEs (e.g., 120 of FIG. 1), and the RLC layer 230 may be a layer for supporting reliable transmission of data.

In an embodiment of the disclosure, each of the plurality of UEs may report channel state information to the base station using a channel quality indicator (CQI). The base station may periodically obtain channel state information at designated time intervals. For example, the designated time interval may be a time corresponding to a symbol, a slot, a subframe, a half-frame, a frame, or the like. In an embodiment of the disclosure, channel state information is information generated by each of the plurality of UEs, and may be a result of measuring the channel quality based on a reference signal received from the base station. In an embodiment of the disclosure, the channel state information may include information for at least one of a precoding matrix indicator (PMI), a rank indicator (RI), or a CQI.

In an embodiment of the disclosure, channel state information obtained from each of the plurality of UEs may be delivered from the PHY layer 210 to the MAC layer 220. In an embodiment of the disclosure, a modulation and coding scheme (MCS) index may be determined based on the channel state information indicating a channel state for each of the plurality of UEs. In an embodiment of the disclosure, BO obtained from each of the plurality of UEs may be transferred from the RLC layer 230 to the MAC layer 220.

In an embodiment of the disclosure, the MAC layer 220 may perform scheduling of packets obtained from the plurality of UEs by using the channel state information obtained from the PHY layer 210 and the BO obtained from the RLC layer 230. In an embodiment of the disclosure, the MAC layer 220 may allocate RBs based on a scheduling priority of each of the plurality of UEs (e.g., active UEs), an MCS level (or MCS index), and the amount of traffic in a buffer.

The MAC layer 220 may operate as a MAC scheduler 222 to schedule packets obtained from the plurality of UEs. In an embodiment of the disclosure, the MAC scheduler 222 may refer to a hardware component that performs a scheduling operation in the MAC layer 220. Additionally or alternatively, the MAC scheduler 222 may refer to a software component that performs a scheduling operation in the MAC layer 220. For example, the MAC scheduler 222 may include at least one algorithm for determining a scheduling priority and performing resource allocation based on the scheduling priority.

In an embodiment of the disclosure, for resource allocation, the MAC scheduler 222 may select a plurality of active UEs from among UEs connected to the base station. For example, the MAC scheduler 222 may determine a UE with BO greater than 0 as an active UE, based on each UE's BO obtained from the RLC layer 230. The MAC scheduler 222 may generate an active UE set including UEs determined to be active UEs.

In an embodiment of the disclosure, the MAC scheduler 222 may calculate scheduling priorities for a plurality of active UEs. To achieve this, the MAC scheduler 222 may calculate a scheduling metric for an active UE based on an arbitrary scheduling algorithm or artificial intelligence (AI) model. For example, the MAC scheduler 222 may use a scheduling algorithm (or mechanism) or AI model constructed for resource efficiency optimization. The MAC scheduler 222 may arrange active UEs based on the calculated scheduling metric. In other words, the MAC scheduler 222 may determine a scheduling priority of each UE based on its scheduling metric value.

In an embodiment of the disclosure, the MAC scheduler 222 is a generalized proportional fairness (GPF) scheduler and may determine an allocation priority (i.e., a scheduling priority) of each UE based on a GPF metric. In detail, the GPF metric may be used to derive allocation priorities for UEs based on Equation (1) below:

$$P_i(t) = \frac{R_i(t)^\beta}{A_i(t)^\alpha} \tag{1}$$

where $R_i(t)$ denotes a (potentially) achievable data rate of UE i at time slot t, and $A_i(t)$ denotes a (historical) average data rate of UE i at time slot t. Parameters alpha ($\alpha$) and beta ($\beta$) having values between 0 and 1 may be control parameters of the GPF scheduler, which manage a resource allocation policy. $\alpha$ denotes a parameter associated with an increase in fairness, and as a value of parameter $\alpha$ increases, fairness may increase while throughput may decrease. Similarly, as the value of parameter $\alpha$ decreases, fairness may decrease and throughput may increase. $\beta$ denotes a parameter associated with an increase in throughput, and as a value of parameter $\beta$ increases, fairness may decrease while throughput may increase. Similarly, as the value of $\beta$ decreases, fairness may increase and throughput may decrease.

The average data rate ($A_i(t)$) in Equation (1) may be calculated by using Equation (2) below:

$$A_i(t+1)=(1-\gamma)\cdot A_i(t)+\gamma\cdot R_i(t). \tag{2}$$

where gamma ($\gamma$) having a value from 0 to 1 is a coefficient of an exponential moving average, which may represent a term over which the average is calculated. Therefore, $A_i(t)$ may denote an exponential average data rate up to time slot t. In Equation (2), an increase in the value of $\gamma$ may lead to a decrease in the range of change in $A_i(t)$ and a decrease in the effect of $A_i(t)$ in the GPF metric. In this case, the sensitivity of parameters $\alpha$ and $\beta$ in the GPF metric may increase. In Equation (2), a decrease in the value of $\gamma$ may lead to an increase in the range of change in $A_i(t)$ and an increase in the effect of $A_i(t)$ in the GPF metric. In this case, the sensitivity of parameters $\alpha$ and $\beta$ in the GPF metric may decrease. Thus, $\gamma$ close to 0 means that the GPF scheduler considers a long-term average throughput, and $\gamma$ close to 1 means that the GPF scheduler considers a short-term average throughput.

When a scheduling priority is determined based on an arbitrary scheduling metric (e.g., a GPF metric), the scheduling priority and resource allocation may vary according to values of parameters in the scheduling metric (e.g., $\alpha$, $\beta$, and $\gamma$ in the GPF metric). Therefore, an electronic device needs to derive an optimal parameter combination for resource allocation efficiency. Due to a dynamically changing environment, optimum parameter combinations may vary each time. According to an embodiment of the disclosure, when performing scheduling, the electronic device may adaptively change each parameter in order to obtain an optimal parameter combination that dynamically reflects a continuously changing environment. In an embodiment of the disclosure, the electronic device may use a neural network model to calculate values of parameters reflecting an environment during a scheduling operation.

The MAC scheduler 222 may allocate one or more available RBs included in one time slot to at least one active UE. In an embodiment of the disclosure, the MAC scheduler 222 may allocate resources based on scheduling priorities of a plurality of active UEs. For example, the MAC scheduler 222 may allocate RBs to each UE based on a scheduling priority, along with required RBs for each UE derived from an MCS level and the amount of traffic in a buffer.

In detail, when the number of required RBs for a highest priority UE exceeds the number of available RBs, the MAC scheduler 222 may allocate all available RBs to the highest priority UE. On the other hand, when the number of required RBs for the highest priority UE does not exceed the number of available RBs, the MAC scheduler 222 may allocate to the highest priority UE as many RBs as the required RBs. For the remaining RBs, an opportunity for an allocation may be provided to a UE with a next highest priority in the same manner as described above. This allocation process may continue until there is no more available RBs at that time slot.

The above-described allocation process is an example of an algorithm for allocating resources based on a scheduling priority, but is not limited thereto. In addition, a metric used to determine a scheduling priority is not limited to the above-described GPF metric. For example, a scheduler may use at least one of another metric, an algorithm, or an AI model to determine a scheduling priority.

Figure 3:
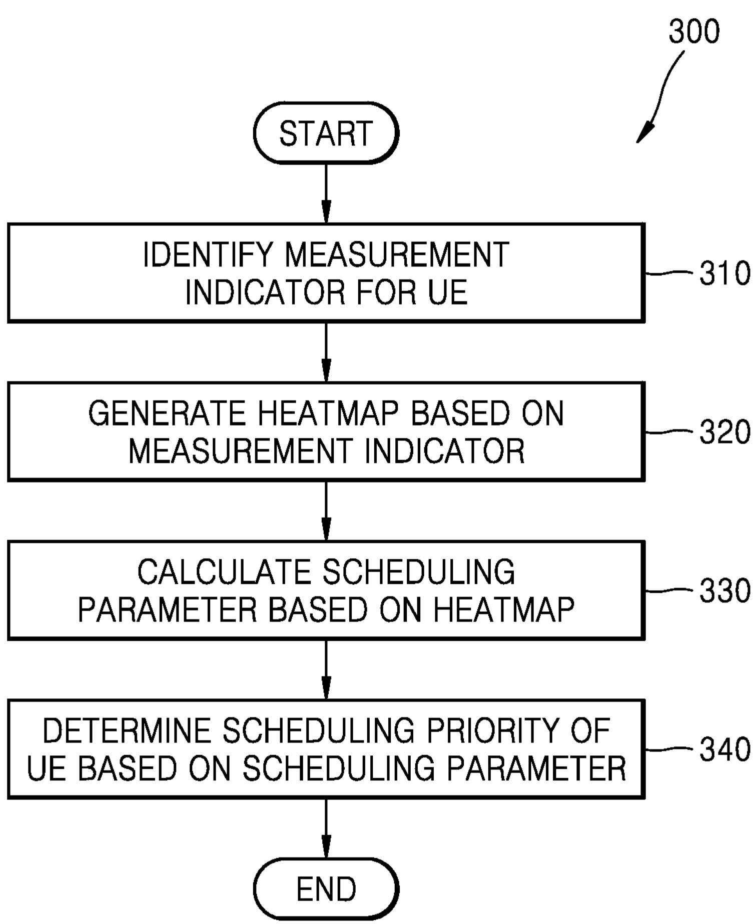
FIG. 3 illustrates a method, performed by an electronic device, of determining a scheduling priority of a UE, according to an embodiment of the disclosure.

FIG. 3 is a flowchart of a method, performed by an electronic device, of determining a scheduling priority of a UE, according to an embodiment of the disclosure.

Referring to FIG. 3, a method 300, performed by an electronic device (e.g., the base station 110 of FIG. 1), of determining a scheduling priority of a UE, according to an embodiment of the disclosure, may include operations 310 to 340. In an embodiment of the disclosure, operations 310 to 340 may be executed by at least one processor included in the electronic device. In one and more embodiments of the disclosure, the method 300, performed by the electronic device, of determining a scheduling priority of a UE is not limited to that shown in FIG. 3, and may further include other operations.

In operation 310, the electronic device may identify values of one or more measurement indicators fora first UE associated with (e.g., communicating with) the electronic device in a first time section. In an embodiment of the disclosure, the electronic device may obtain, from the first UE, values of one or more measurement indicators for the first UE. In an embodiment of the disclosure, the electronic device may calculate a value of an arbitrary measurement indicator for the first UE. For example, the electronic device may obtain channel state information, etc. from the first UE and calculate a value of an arbitrary measurement indicator based thereon.

In operation 320, the electronic device may generate a first heatmap for the first time section, based on the one or more measurement indicators for the first UE. A dimension of the first heatmap may correspond to the number of the one or more measurement indicators, and each axis of the first heatmap may correspond to each of the measurement indicators. In an embodiment of the disclosure, the electronic device may generate a first heatmap by accumulating, on a heatmap, the values of the one or more measurement indicators for each of the first UE. For example, the electronic device may generate a first heatmap by accumulating a combination of measurement indicators for each first UE on a heatmap.

The electronic device may generate a plurality of heatmaps for a plurality of time sections by repeating operations 310 and 320 for time sections following the first time section. For example, the electronic device may generate a second heatmap for a second time section by identifying one or more measurement indicators for a second UE associated with (e.g., communicating with) the electronic device in the second time section. In this case, the first UE may be identical to or different from the second UE. In an example, UEs communicating with electronic device in the first time section may be identical to or completely or partially different from UEs communicating with electronic device in the second time section. The generated plurality of heatmaps may be stored in at least one of a memory of the electronic device or a storage device (e.g., a USB-type graphics processing unit (GPU) acceleration device) connectable or connected to the electronic device.

In operation 330, the electronic device may calculate one or more scheduling parameters based on the first heatmap by using at least one neural network model. In an embodiment of the disclosure, the electronic device may use at least one neural network model to calculate values of one or more scheduling parameters based on the plurality of heatmaps including the first heatmap. The one or more scheduling parameters calculated by the electronic device in operation 330 may be different depending on a scheduling method (e.g., a scheduling algorithm, a scheduling metric, a resource allocation algorithm, etc.).

In an embodiment of the disclosure, the at least one neural network model in operation 330 is a model trained to calculate one or more scheduling parameters and may include a first sub-model and a second sub-model. For example, the first sub-model may be a convolutional neural network (CNN) model, a U-NET model, an auto-encoder, etc. used to extract feature data from a heatmap. The second sub-model is a transformer-based model or the like, such as a long short-term memory (LSTM) model, a recurrent neural network (RNN) model, bidirectional encoder representations from transformers (BERT), etc., which reflect history of a plurality of pieces of data.

In an embodiment of the disclosure, the electronic device may extract a plurality of features from a plurality of heatmaps by using the first sub-model. The electronic device may use the second sub-model to derive a plurality of time-dependent features based on the plurality of features extracted from the plurality of heatmaps. In other words, the electronic device may derive features in which a history between the plurality of heatmaps is reflected. The electronic device may calculate one or more scheduling parameters based on the derived plurality of time-dependent features.

In an embodiment of the disclosure, the at least one neural network model may include a learning model trained via any one of reinforcement learning, machine learning, continual learning, federated learning, and deep learning.

In operation 340, the electronic device may determine, based on the one or more scheduling parameters, scheduling priorities for one or more UEs. In an embodiment of the disclosure, the electronic device may reflect the calculated values of one or more scheduling parameters in a scheduling metric (e.g., a GPF metric) to determine scheduling priorities for one or more active UEs that have requested resource allocation from the electronic device. The one or more UEs in operation 340 may be active UEs requesting resource allocation, and may be completely or partially identical to or different from the first UE in operations 310 and 320.

Operations 310 to 340 of FIG. 3 may be performed by at least one processor of the base station, but are not limited thereto. For example, operations 310 to 340 may be performed by at least one processor of an electronic device connected to the base station or capable of communicating with the base station in a wired or wireless manner.

Figure 4:
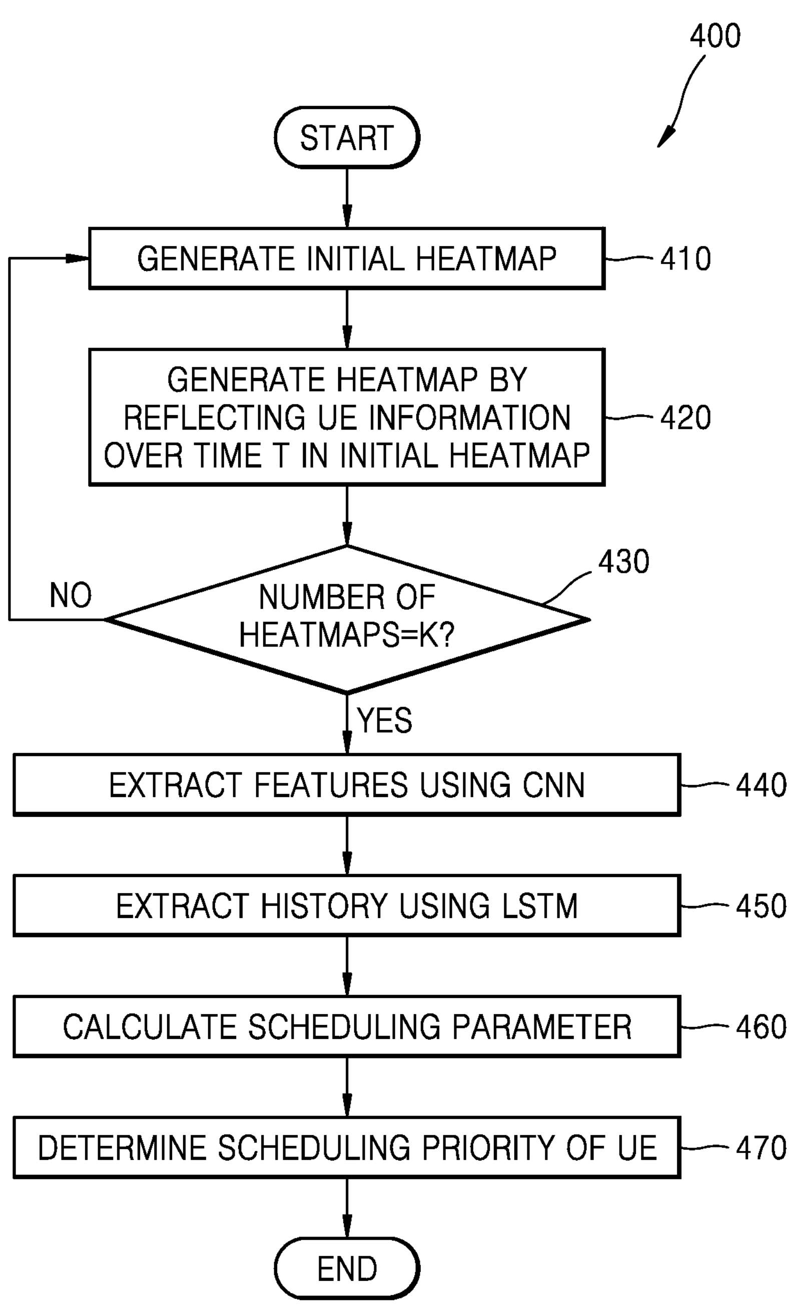
FIG. 4 illustrates a method, performed by an electronic device, of determining a scheduling priority of a UE, according to an embodiment of the disclosure.

FIG. 4 is a flowchart of a method, performed by an electronic device, of determining a scheduling priority of a UE, according to an embodiment of the disclosure.

Referring to FIG. 4, a method 400, performed by an electronic device (e.g., the base station 110 of FIG. 1), of determining a scheduling priority of a UE may include operations 410 to 470. In an embodiment of the disclosure, operations 410 to 470 may be executed by at least one processor included in the electronic device. In one and more embodiments of the disclosure, the method 400, performed by the electronic device, of determining a scheduling priority of a UE is not limited to that shown in FIG. 4, and may further include other operations. In an embodiment of the disclosure, the electronic device may perform the method 400 of determining a scheduling priority of a UE with a period of k*T in order to calculate a scheduling parameter adaptive to a changing channel condition.

In operation 410, the electronic device may generate an initial heatmap. For example, the electronic device may generate an initial heatmap as an initial data space for accumulating pieces of UE information (e.g., one or more measurement indicators) by counting the pieces of UE information. In an embodiment of the disclosure, a dimension of the initial heatmap may correspond to the number of pieces of UE information to be used to calculate scheduling parameters by electronic device, and each axis of the initial heatmap may correspond to each of the pieces of UE information. For example, when the pieces of UE information are an MCS index, a remaining buffer (or BO), and an average throughput, an X-axis of the heatmap may correspond to the MCS index, a Y-axis thereof may correspond to the remaining buffer (or BO), and a Z-axis thereof may correspond to the average throughput.

In an embodiment of the disclosure, a size of the initial heatmap may be determined according to (or based on) a configuration value for (or associated with) the electronic device. In detail, the size of the initial heatmap may be determined based on minimum and maximum values of each measurement indicator, and at least one of a minimum value or a maximum value of each of the one or more measurement indicators may be determined according to (or based on) the configuration value for (or associated with) the electronic device. For example, theoretical minimum and maximum values of at least one measurement indicator may be determined according to (or based on) a configuration value of a base station and/or a cell. A length of an axis corresponding to each measurement indicator may be determined according to minimum and maximum values of a corresponding measurement indicator, and accordingly, the size of the initial heatmap may be determined. Accordingly, the size of the initial heatmap may be different for each electronic device. Alternatively, when different electronic devices have the same configuration value, the size of their initial heatmaps may be equal.

In operation 420, the electronic device may generate a heatmap by reflecting pieces of UE information over time T in the initial heatmap. The time T may be a length of a time section for which one heatmap is generated. In an embodiment of the disclosure, the time T may be equal to a heatmap generation period. In an embodiment of the disclosure, the time T may be included in the heatmap generation period. For example, when the electronic device generates a heatmap every second (i.e., when the heatmap generation period is 1 second (sec)), the electronic device may generate a heatmap corresponding to a period, based on UE information for 0.8 sec within the period.

In an embodiment of the disclosure, the length of a time section, i.e., time T, may be determined based on environmental factors associated with the electronic device. The environmental factors associated with the electronic device may include external environmental factors, such as geographical, topographical, timing, temporal, and weather factors that affect communication between a base station and UEs. Additionally or alternatively, the environmental factors associated with the electronic device may include network state information, traffic information, UE information in the base station, etc. In other words, the environmental factors associated with the electronic device may include factors related to the state of a communication system.

For example, when a change in a traffic pattern for each UE is dynamic, the time T may be set short, and when the change in traffic pattern for each UE is static, the time T may be set long. For example, the time T may be set to be shorter as an average number of active UEs per day increases. In detail, while the time T is set to 1 sec when the number of active UEs is 5, the time T may be set to 0.5 sec when the number of UEs is 10. In other words, as the number of active UEs increases by a certain unit, the time T may decrease. Because a sufficient volume of data needs to be accumulated due to the nature of the heatmap, the time T may be set long for a base station that is not frequently used by a UE.

In an embodiment of the disclosure, the length of a time section, i.e., time T, may be determined based on a configuration value associated with the electronic device. For example, as a bandwidth of the base station becomes larger, the time T may be set to be shorter. In detail, when the bandwidth of the base station is 20 megahertz (MHz), the time T may be set to 1 sec, and when the bandwidth of the base station is 40 MHz, the time T may be set to 0.5 sec.

In operation 430, the electronic device may determine whether the number of generated heatmaps is k. In response to determining that the number of generated heatmaps is not k (i.e., less than k), the electronic device may repeat operations 410 to 430. That is, the electronic device may generate k heatmaps for k time sections in order to calculate one or more scheduling parameters. A length of each of the k time sections is equal to the time T, but each of the k time sections may have a different start time point (and a different end time point).

In an embodiment of the disclosure, a value of k (i.e., the number of a plurality of periods) may be determined based on environmental factors associated with the electronic device. The environmental factors associated with the electronic device may include external environmental factors, such as geographical, topographical, timing, temporal, and weather factors that affect communication between a base station and UEs. Additionally or alternatively, the environmental factors associated with the electronic device may include network state information, traffic information, UE information in the base station, etc. In other words, the environmental factors associated with the electronic device may include factors related to the state of a communication system.

For example, the value of k may be set relatively high in a high traffic environment, and the value of k may be set relatively low in a low traffic environment. Additionally or alternatively, when the average number of active UEs per day for the base station is large, the value of k may be set relatively high, and when the average number of active UEs per day is small, the value of k may be set relatively low. For example, the value of k may increase each time the average number of active UEs per day increases by a certain unit (e.g., 5) from a reference value (e.g., 5). Specifically, the value of k may be set to 1 for 5 active UEs, and the value of k may be set to 2 for 10 active UEs.

In an embodiment of the disclosure, the value of k (i.e., the number of a plurality of periods) may be determined based on a configuration value associated with the electronic device. For example, as the bandwidth of the base station becomes larger, the value of k may be set to be larger. In detail, when the bandwidth of the base station is 20 MHz, the value of k may be set to 5, and when the bandwidth of the base station is 40 MHz, the value of k may be set to 10.

In response to determining that the number of generated heatmaps is k, the electronic device may perform operations of 440 to 470. The value of k is the number of heatmaps input to a neural network model used in operations 440 to 460. In an embodiment of the disclosure, the electronic device may calculate values of one or more scheduling parameters based on the k heatmaps by using at least one neural network model. In an embodiment of the disclosure, the at least one neural network model may include a CNN model and an LSTM model.

In operation 440, the electronic device may extract a feature from each heatmap by using a CNN model. In detail, the electronic device may extract k features from the k heatmaps by using the CNN model. In an embodiment of the disclosure, a feature extracted from each heatmap may include a feature value for a distribution of pieces of UE information reflected in each heatmap.

In operation 450, the electronic device may extract a time-dependent feature based on the feature extracted from each heatmap by using an LSTM model. In detail, the electronic device may extract k time-dependent features based on the k features extracted in operation 440. In an embodiment of the disclosure, the electronic device may extract time-dependent features reflecting a history of the features from the sequential k heatmaps.

In operation 460, the electronic device may calculate one or more scheduling parameters based on extracted time-dependent features. In an embodiment of the disclosure, the electronic device may derive one or more scheduling parameters based on time-dependent features by using an LSTM model. Additionally or alternatively, the electronic device may derive one or more scheduling parameters using a fully connected layer (FCL).

In operation 470, the electronic device may determine scheduling priorities of one or more UEs based on the calculated one or more scheduling parameters. For example, the electronic device may determine scheduling priorities of active UEs by using a scheduling metric based on the calculated scheduling parameters. Additionally, the electronic device may allocate radio resources to active UEs based on the determined scheduling priorities.

FIG. 4 illustrates the method in which the electronic device generates all of the k heatmaps and then extracts k features therefrom by using the CNN model, the disclosure is not limited thereto. For example, after one heatmap is generated, the electronic device may extract a feature from the heatmap by using a CNN model without waiting for generation of a next heatmap.

In addition, FIG. 4 illustrates the method in which the electronic device generates all of the k heatmaps and then extracts time-dependent features using an LSTM model, the disclosure is not limited thereto. For example, as a feature for a heatmap is extracted, the electronic device may extract a time-dependent feature based on the feature for the heatmap.

FIG. 5 is a diagram illustrating an example in which an electronic device performs resource allocation, according to an embodiment of the disclosure.

A MAC layer (e.g., 220 of FIG. 2) of a base station may perform scheduling for resource allocation. In an embodiment of the disclosure, a scheduler of the MAC layer may create an active UE set by selecting UEs having data to be transmitted in buffers. For example, as shown in FIG. 5, the scheduler may create an active UE set (or active UE list) (UE 0, . . . , and UE m) by selecting UEs having data to be transmitted in buffers from a UE list (UE 0, . . . , and UE n). In this case, the number of UEs included in the active UE set may be less than or equal to the number of UEs included in the UE list.

In an embodiment of the disclosure, the scheduler may provide pieces of information of all UEs included in the UE list to an agent in order to obtain a scheduling parameter. For example, as shown in FIG. 5, the scheduler may transmit, to the agent, MCS indexes, average throughputs, and remaining buffers of all UEs included in the UE list. The agent shown in FIG. 5 may refer to a software component for calculating a scheduling parameter.

In an embodiment of the disclosure, the agent may include at least one neural network model trained via reinforcement learning. The agent may be stored in a storage space within the base station. Additionally or alternatively, the agent may be stored in a storage device that is connectable to the base station or communicable therewith in a wired or wireless manner. In this case, the scheduler may use the agent stored in the storage device connectable to the base station or communicable therewith in a wired or wireless manner. For example, the agent stored in the storage device connected to the base station or communicating therewith in a wired or wireless manner may be loaded into a memory in the base station and used for inferring scheduler parameters.

In an embodiment of the disclosure, UE information input to the agent may be information corresponding to state variables of reinforcement learning for the agent. That is, the agent shown in FIG. 5 may include a network model trained via reinforcement learning using data regarding an MCS index, an average throughput, and a remaining buffer as state variables. In an embodiment of the disclosure, the agent may be a network model trained via reinforcement learning using a key performance indicator (KPI) for determining resource efficiency as a reward variable. For example, the agent shown in FIG. 5 may be a network model trained via reinforcement learning using an user perceived throughput and a packet delay violation as reward variables.

In an embodiment of the disclosure, the agent may generate a heatmap based on the received UE information. For example, the agent may generate a three-dimensional (3D) heatmap based on received information about the MCS index, average throughput, and remaining buffer of each UE. In an embodiment of the disclosure, the agent may generate a new heatmap for every period (e.g., an inference period or a heatmap generation period) to reflect a history for a heatmap where UE information is accumulated. The agent may derive optimal scheduling parameters by performing feed-forward using a CNN-LSTM neural network model based on a plurality of generated heatmaps (e.g., k heatmaps).

In an embodiment of the disclosure, the scheduler may determine scheduling priorities of active UEs included in the active UE set by using scheduling parameters derived from the agent. As shown in FIG. 5, the scheduler may determine scheduling priorities of active UEs by reflecting scheduling parameters in a proportional fair(ness) (PF) metric, and arrange the active UEs based on the determined scheduling priorities. FIG. 5 shows that the scheduler determines scheduling priorities based on the PF metric, the disclosure is not limited thereto.

The scheduler may allocate resources to the arranged active UEs. In other words, the scheduler may allocate at least one RB in the order that the active UEs are arranged. For example, the scheduler may allocate radio resources to packets for each active UE in the order that the active UEs are arranged.

A scheduler performing allocation within limited resources may achieve optimization of resource allocation through an efficient resource allocation policy. The optimization of resource allocation may include maximizing a user perceived throughput while satisfying a packet delay constraint. That is, the optimization of resource allocation may reflect maximization of the performance experienced by a UE. The optimization of resource allocation may be expressed by Equation (3) below:

$$\text{maximize } U(t) = \frac{\sum_n b_n(t)}{\sum_n (l_n(t) + d_n(t))}, \text{ s.t. } \xi_n(t) = 0, \forall n \tag{3}$$

where $b_n(t)$ denotes the number of bits transmitted by an n-th UE until time slot t. $l_n(t)$ may denote a total latency of the n-th UE until time slot t at the base station. The latency $l_n(t)$ is a time interval between packet arrival at the base station and beginning of transmission. $d_n(t)$ may denote a total delay indicating a time interval from first packet transmission to last packet transmission by the n-th UE. Furthermore, $\xi_n(t)$ is the number of packets that violate the delay constraint, and may be expressed by Equation (4) below:

$$\xi_n(t) = \sum_{t'=1}^{t} |l_n(t') > l_{thres}| \tag{4}$$

where t denotes a slot index, and $l_n(t)$ denotes a latency of the n-th UE at time slot t. Also, $l_{thres}$ may denote a latency threshold given by requirements. Accordingly, $\xi_n(t)$ may represent the number of latencies exceeding the latency threshold, i.e., the number of packets that violate the delay constraint.

U(t) in Equation (3) and Equation (4) both include the term $l_n(t)$. That is, because the user-perceived throughput and the packet delay violation are both associated with $l_n(t)$, the user perceived throughput and the packet delay violation are correlated with each other. Furthermore, as the number of UEs increases, the complexity of optimization problem of resource allocation increases exponentially. In addition, for a scheduling parameter combination consisting of a plurality of parameters (e.g., $\alpha$, $\beta$, and $\gamma$), a search space (i.e., a search range) for finding an optimal parameter combination may become enormous as a multidimensional space. Therefore, it may not be easy to derive an optimal point that maximizes the user perceived throughput while satisfying the packet delay constraint.

Referring to FIG. 5, the scheduler may use the agent including a neural network model trained via reinforcement learning for optimized resource allocation. The neural network model may be a learning model trained to infer one or more scheduling parameters. In one embodiment, the trained neural network model may be used to infer the one or more scheduling parameters. In an embodiment of the disclosure, for the optimization of resource allocation, a reinforcement learning-based Markov decision process (MDP) may be used. In an embodiment of the disclosure, in the reinforcement learning, a state variable may include one or more measurement indicators, an action variable may include one or more scheduling parameters, and a reward variable may include an user perceived throughput and a packet delay violation.

At each time step t, the agent may take action variables (e.g., values of the action variables at time step t) from a set of all possible actions. That is, the agent may take an action according to the action variables included in the set of actions. In an embodiment of the disclosure, an action variable may include a scheduling parameter at each time step t. The action variable including a scheduling parameter may govern a resource allocation policy (e.g., a scheduling metric and a scheduling algorithm) of a scheduler. For example, for a scheduler using a GPF metric, action variables for the agent may be a combination of parameters $\alpha$, $\beta$, and $\gamma$ in the GPF metric, and a combination of parameters $\alpha$, $\beta$ and $\gamma$ that is the action variables may govern a resource allocation policy of the GPF scheduler.

By performing communication with UEs based on the action variables, the base station may return next state variables (e.g., values of the state variables at time step t+1) ($s_{t+1}$, $s_{t+1} \in S$ where S is a set of possible states) and next reward variables (e.g., values of the reward variables at time step t+1) ($r_{t+1}$, $r_{t+1} \in R$ where R is a set of possible rewards) to the agent. The Markov decision process may be used to train the agent in a direction to maximize cumulative rewards.

In detail, the state variables may represent the state of a network for best decision making. In an embodiment of the disclosure, the state variables may include an MCS index Cn, an average throughput Tn, and a remaining buffer Bn for the n-th UE. The MCS index Cn may reflect a current channel state for the n-th UE to thereby indicate the number of information bits to be transmitted when the n-th UE is assigned RBs. The average throughput Tn may contain an exponential moving average of past transmissions. The remaining buffer Bn may indicate a volume of traffic in a buffer waiting for transmission. A tuple of the above-described measurement indicators, i.e., a combination of the measurement indicators Cn, Tn, and Bn, may indicate a current network state as well as results of past allocations.

The reward variables may reflect the above-described optimization problem of resource allocation. That is, the reward variables may be designed as a function of an user perceived throughput and the number of packet delay violations to reflect user-level quality of service (QoS). For stability, metrics for the user perceived throughput and the packet delay violations may be each normalized and multiplied by their weights, and the products may be then added. For example, a total reward variable for each time step t may be expressed by Equation (5) below, based on weights along with the user perceived throughput and packet delay violation.

$$r_t = w \cdot r_{tput} - (1-w) \cdot r_{delay} \tag{5}$$

where $r_{tput}$ denotes a user perceived throughput reward, and $r_{delay}$ denotes a packet delay violation reward. w may be a real number greater than 0 but less than 1. Because the objective of resource allocation optimization is to maximize the user perceived throughput, a weight of the user perceived throughput reward may be set to a positive number. On the other hand, because a weight for the packet delay violation reward is for adding a penalty, the weight may be set to a negative number.

In order to bound the user perceived throughput reward between 0 and 1 by taking into account a maximum bandwidth, the user perceived throughput may be normalized to a maximum achievable throughput as shown in Equation (6) below:

$$r_{tput} = \frac{U(t)}{U_{max}} \tag{6}$$

where $U_{max}$ denotes a theoretical maximum throughput based on bandwidth B. Also, U(t) may represent the user perceived throughput at time t.

The packet delay violation may be an unbounded positive value as defined in Equation (4) above. Therefore, the value may be scaled to a range between −1 and 1 using a hyperbolic tangent (tanh) function as shown in Equation (7) below:

$$r_{delay} = \tanh(\xi_n(t)) \tag{7}$$

Thus, a violation penalty is 0 when there is no packet delay violation at all, and may increase with the number of delay violations.

A policy in reinforcement learning may generate a probability distribution over an action variable space according to the state of the network (i.e., state variables), as shown in Equation (8) below:

$$\pi(a_t|s_t), s_t \in S, a_t \in A \tag{8}$$

where $\pi(a_t|s_t)$ denotes the probability of taking an action corresponding to an action variable $a_t$, observing state variables $s_t$ at time t. For example, to find an optimal policy, a proximal policy optimization (PPO) algorithm that is a reinforcement learning framework may be used. The optimal policy may be trained to maximize expected cumulative rewards over a period of time $\varepsilon$ called an episode in reinforcement learning. An expected cumulative reward at the end of the episode at each time step t may be given by Equation (9) below:

$$G_t = \sum_{t \in \varepsilon} \tau^{|\varepsilon|-t} \cdot r_t \tag{9}$$

where $\tau \in (0,1]$ denotes a discount factor for future rewards. Because a state space S is a high-dimensional space composed of continuous variables, a neural network model corresponding to the above-described policy may be used.

Accordingly, the agent shown in FIG. 5 may include a neural network model trained via the Markov decision process based on the reinforcement learning including the action variables, the state variables, the reward variables, and the policy.

Figure 6:
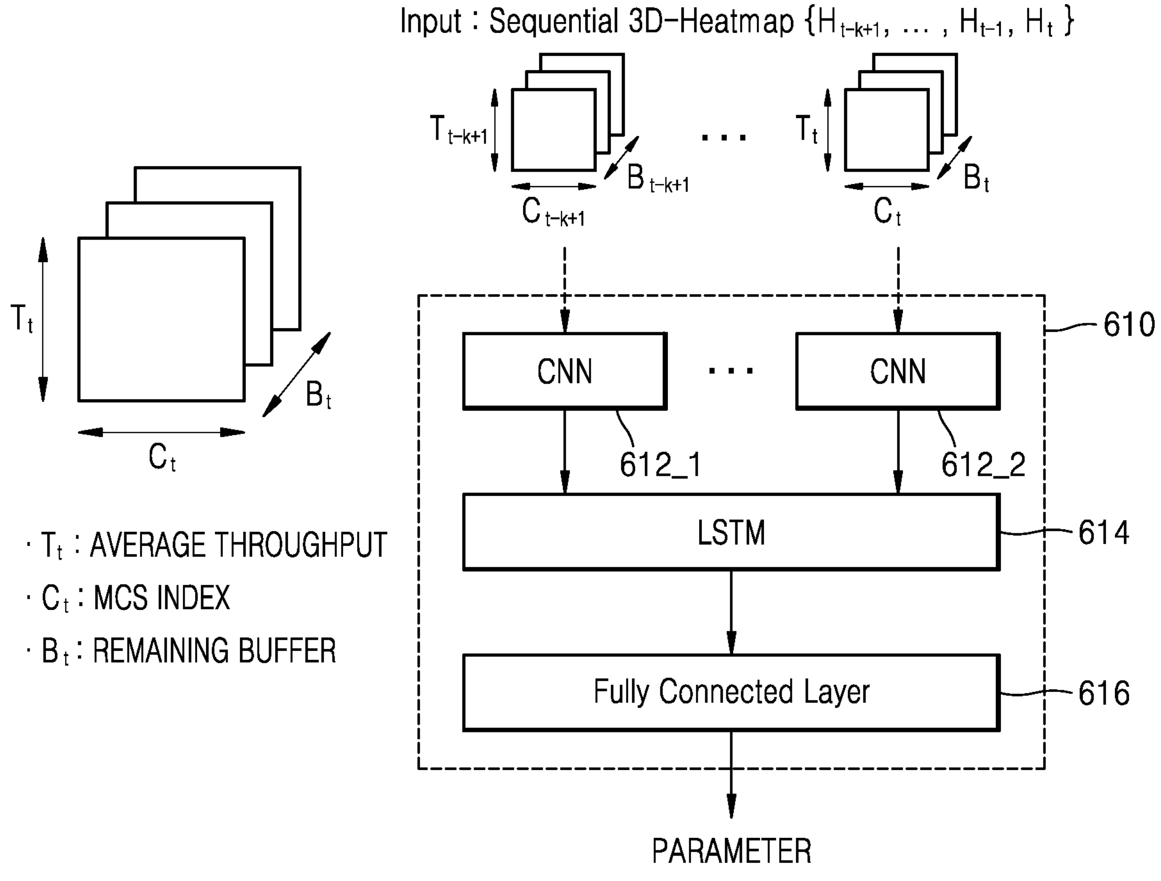
FIG. 6 illustrates an example in which an electronic device generates a heatmap and calculates scheduling parameters, according to an embodiment of the disclosure.

FIG. 6 is a diagram illustrating an example in which an electronic device generates a heatmap and calculates scheduling parameters, according to an embodiment of the disclosure.

A neural network model may work on input data of a certain size. For example, when the input data has a different size than input data at the time of training, the neural network model may not operate or output a result with low accuracy. Because the number of UEs included in a base station area changes every moment in an actual communication system environment, the electronic device may need data having the same size despite the change in the number of UEs in order to use the neural network model. According to an embodiment of the disclosure, to perform scheduling via a neural network model, the electronic device may represent measurement indicators of each UE as a heatmap to reflect dynamically changing information of UEs.

The electronic device may generate a heatmap for each time section by counting pieces of data of each UE corresponding to each measurement indicator used for scheduling. In an embodiment of the disclosure, the electronic device may respectively generate a plurality of heatmaps for a plurality of time sections. In detail, the electronic device may generate a heatmap by identifying measurement indicators for UEs associated with (e.g., communicating with) the electronic device in a time section. Each of the measurement indicators may correspond to each axis of the heatmap, and a dimension of the heatmap may correspond to the number of measurement indicators.

In an embodiment of the disclosure, a size of the heatmap may be determined based on a minimum value and a maximum value of each of one or more measurement indicators. In an embodiment of the disclosure, at least one of a minimum value or a maximum value of each of the one or more measurement indicators may be determined according to (or based on) a configuration value for (or associated with) the electronic device. For example, a maximum allocable transport block size (TBS) value per transmit time interval (TTI) may be determined according to a specification of each base station (a bandwidth in long-term evolution (LTE)/5th generation (5G)), and a minimum value or a maximum value of BO may be determined according to the TBS value. For example, a maximum throughput that is the maximum value of an average throughput may be determined based on at least one of a bandwidth or an antenna type. Therefore, base stations having different configuration values may use heatmaps of different sizes. Also, when different base stations have the same configuration value, a heatmap having the same size may be used.

Referring to FIG. 6, measurement indicators used for scheduling may be average throughput Tt, an MCS index Ct, and a remaining buffer Bt. For scheduling, the electronic device may identify a combination of the average throughput, the MCS index, and the remaining buffer of each UE in a time section. The MCS index may be discrete data, and the average throughput and the remaining buffer may be continuous data. In this case, the electronic device may quantize an average throughput and a remaining buffer to construct the heatmap. For example, the electronic device may quantize the average throughput up to a theoretical maximum throughput with a quantization granularity of 1 Mbps. The electronic device may quantize the remaining buffer to the number of time slots required to empty the buffer, assuming full RB allocation and a current channel state represented by an MCS level.

The electronic device may map the identified combination of measurement indicators of each UE onto a 3D heatmap $H_t$ consisting of a Z-axis corresponding to the average throughput, an X-axis corresponding to the MCS index, and a Y-axis corresponding to the remaining buffer. In detail, the electronic device may generate a heatmap $H_{t-k+1}$ by mapping a combination of measurement indicators of each UE over a time section between times t−k and t−k+1. Similarly, the electronic device may respectively generate heatmaps $H_{t-k+2}$, $H_{t-k+3}$, . . . , and $H_t$ for time sections between times t−k+1 and t−k+2, times t−k+2 and t−k+3, . . . , and times t−1 and t.

In an embodiment of the disclosure, the electronic device may calculate one or more parameters based on a plurality of heatmaps by using at least one neural network model 610. To achieve this, the electronic device may input heatmaps (e.g., sequential 3D heatmaps) for sequential time sections to the neural network model 610. The at least one neural network model 610 may include a first sub-model and a second sub-model. Additionally, the at least one neural network model 610 may include a layer for processing output data from a sub-model.

Referring to FIG. 6, the first sub-model of the neural network model 610 trained to calculate parameters based on the heatmaps may be CNN models 612_1 to 612_2, and the second sub-model thereof may be an LSTM model 614. The electronic device may extract a plurality of features by respectively inputting heatmaps to the CNN models 612_1 to 612_2. The CNN models 612_1 to 612_2 of FIG. 6 to which each heatmap is input may be one and the same model.

The electronic device may derive a plurality of time-dependent features by inputting the plurality of features extracted by the CNN models 612_1 to 612_2 to the LSTM model 614. The electronic device may obtain one or more scheduling parameters calculated based on the plurality of time-dependent features via a FCL 616. For example, the final FCL may convert at least one feature output by at least one previous layer into a probability distribution over the action space as in Equation (8) described above with reference to FIG. 5.

FIG. 6 shows that the plurality of heatmaps is simultaneously input to the neural network model 610, the disclosure is not limited thereto. In an embodiment of the disclosure, after at least some in the plurality of heatmaps are generated, they may first be input to the neural network model 610. For example, the plurality of heatmaps may be sequentially input to the neural network model 610 as they are sequentially generated. In detail, after extracting a feature for the heatmap $H_{t-k+1}$ by inputting the heatmap $H_{t-k+1}$ to a CNN model, the electronic device may then extract a feature for the heatmap $H_{t-k+2}$ by inputting the heatmap $H_{t-k+2}$ to the CNN model.

In addition, FIG. 6 illustrates a plurality of heatmaps for a plurality of consecutive time sections, the disclosure is not limited thereto. In an embodiment of the disclosure, there may be an interval between time sections in the plurality of time sections. For example, the electronic device may generate a heatmap for a time section between times t−k+0.5 and t−k+1 and a heatmap for a time section between times t−k+1.5 and t−k+2. In this case, the heatmap generation period is 1 while a length of each time section is 0.5 that is other than 1.

Figure 7:
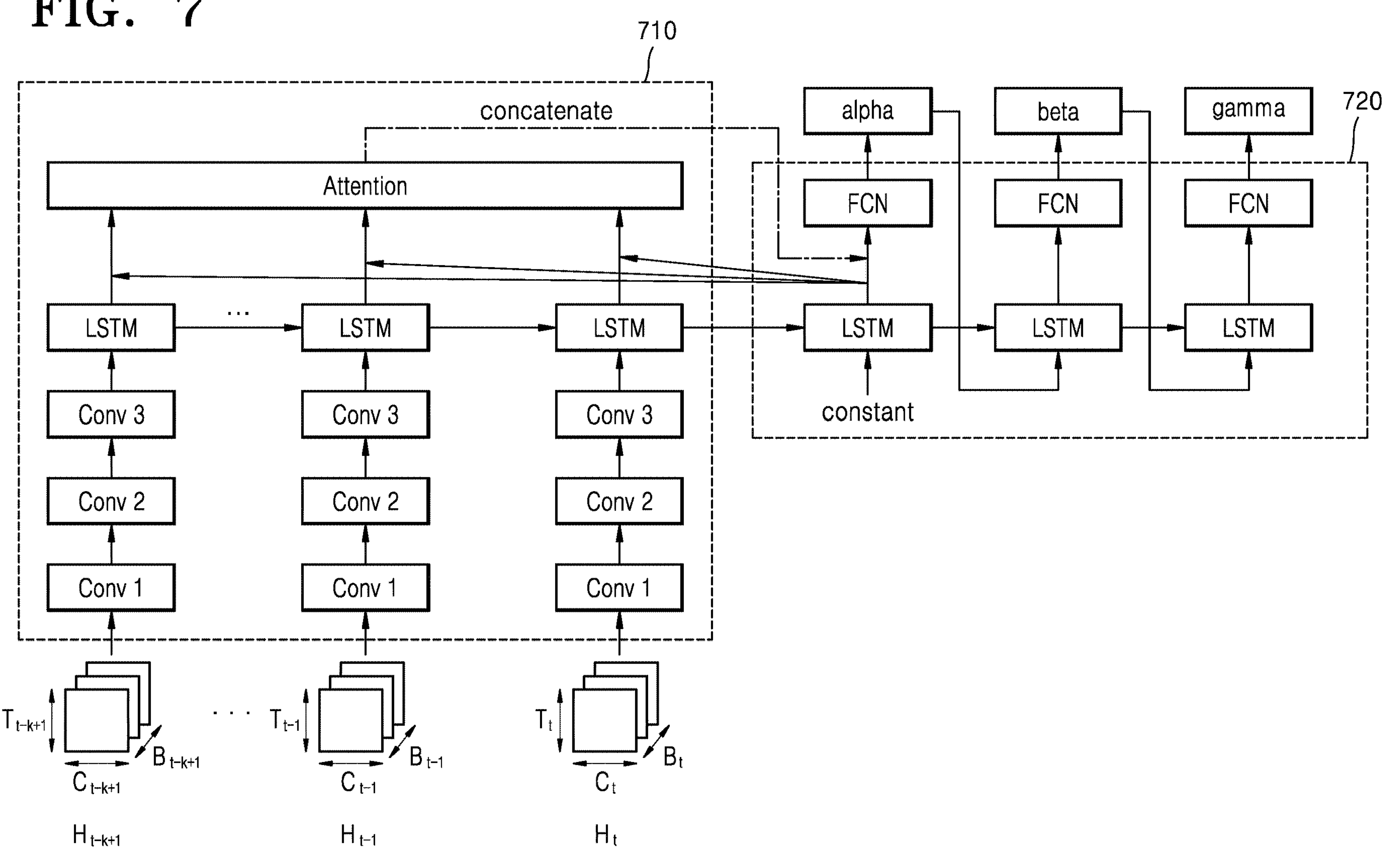
FIG. 7 illustrates an example of a neural network model according to an embodiment of the disclosure.

FIG. 7 is a diagram illustrating an example of a neural network model according to an embodiment of the disclosure.

In an embodiment of the disclosure, the neural network model trained to calculate scheduling parameters may be composed of an encoder 710 and a decoder 720. The encoder 710 may perform feature extraction on input history data. The decoder 720 may determine action variables based on the encoder 710, i.e., based on data from the encoder 710. For example, the decoder may determine action variables by using auto-regressive embedding.

Referring to FIG. 7, the encoder 710 may include CNN models and LSTM models. Also, the decoder 720 may include LSTM models and FCN models. Each FCN model may include at least one FCL. The LSTM models used in the encoder 710 may be one and the same model as the LSTM models used in the decoder 720 of FIG. 7, but the disclosure is not limited thereto.

In an embodiment of the disclosure, because the plurality of heatmaps $H_{t-k+1}, \ldots, H_{t-1}$, and $H_t$ are temporally continuous data, they may be input to the encoder 710 as historical data. The CNN models of the encoder 710 may respectively extract features for the plurality of heatmaps. Each CNN model of FIG. 7 is illustrated as having three layers ("Conv 1", "Conv 2", and "Conv 3"), but is not limited thereto.

The features extracted by the CNN models may be respectively input to the LSTM models of the encoder 710. For example, a feature extracted by each CNN model may be input to a corresponding LSTM model, together with output data from an LSTM model for a heatmap for a previous time step. As shown in FIG. 7, an LSTM model for heatmap $H_t$ may receive output data from an LSTM model for heatmap $H_{t-1}$ together with a feature for the heatmap $H_t$ (i.e., output data from the CNN model for the heatmap $H_t$). Accordingly, the encoder 710 may extract time-dependent features by reflecting time series characteristics of each heatmap.

In an embodiment of the disclosure, the extracted time-dependent features may be corrected or updated using an attention model (or an attention mechanism). In this case, output data from a first LSTM model of the decoder 720 may be reflected. As shown in FIG. 7, the output data from the first LSTM model of the decoder 720 is data output by inputting output data from the last LSTM model of the encoder 710 and a constant to the first LSTM model of the decoder 720.

Output data from the attention model may be concatenated with the output data from the first LSTM model of the decoder 720. The concatenated data may be input to a FCN model, and the FCN model may output data of parameter α. Furthermore, the data of the parameter α and the output data from the first LSTM model of the decoder 720 may be input to a second LSTM model of the decoder 720, and output data from the second LSTM model may be input to a FCN model, so that the FCN model may output data of parameter β. In addition, the data of the parameter β and the output data from the second LSTM model of the decoder 720 may be input to a third LSTM model of the decoder 720, and output data from the third LSTM model may be input to a FCN model, so that the FCN model may output data of parameter γ.

The decoder 720 of FIG. 7 outputs the three parameters, but is not limited thereto. Furthermore, FIG. 7 illustrates that data is generated in the order of α, β, and γ, the disclosure is not limited thereto, and data may be generated in a different order.

FIG. 7 shows that the attention model is included in the encoder 710, the disclosure is not limited thereto. For example, the neural network model trained to calculate scheduling parameters may consist of an encoder, an attention, and a decoder.

Figure 8A:
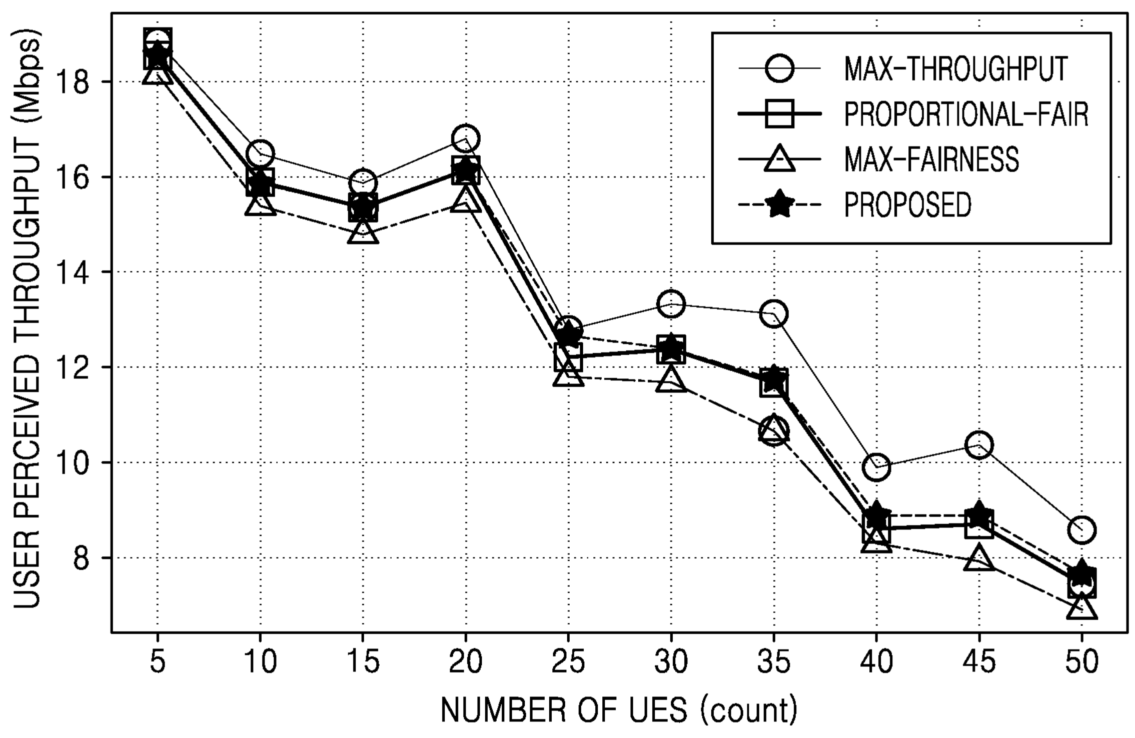
FIG. 8A is a graph illustrating user perceived throughput performance of each scheduler according to an embodiment of the disclosure.
Figure 8B:
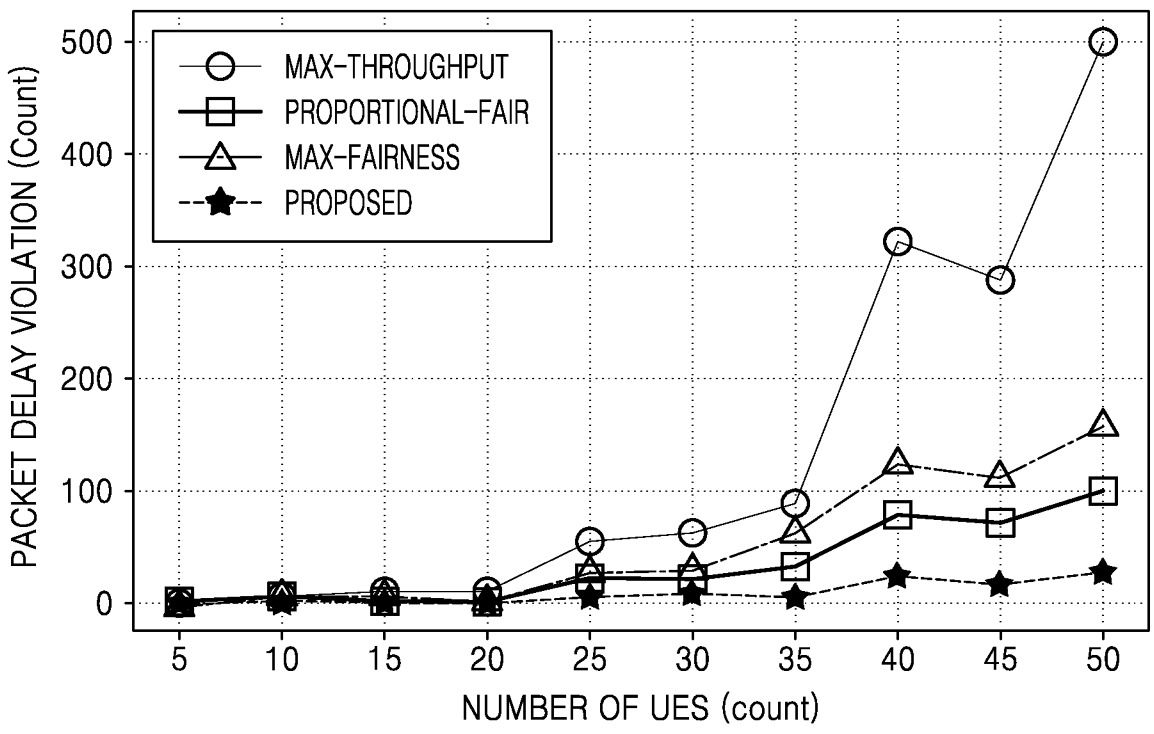
FIG. 8B is a graph illustrating packet delay violation performance of each scheduler according to an embodiment of the disclosure.

FIG. 8A is a graph illustrating performances for the user perceived throughput according to an embodiment of the disclosure. FIG. 8B is a graph illustrating performances for the packet delay violation according to an embodiment of the disclosure. FIGS. 8A and 8B are graphs illustrating performances of the scheduling according to an embodiment of the disclosure.

To evaluate the performance of a scheduler (hereinafter, a proposed scheduler) using a neural network model architecture (e.g., the neural network model of FIG. 5) according to an embodiment of the disclosure, simulation setup may be performed as described below.

A scenario may be defined together with the simulation. A scenario may be a combination of a traffic pattern, the number of users, a mobility pattern, and channel parameters. Ten different scenarios are used as training scenarios, and a scenario which is not included in the training scenarios is used to evaluate the performance of a scheduler using the proposed method (i.e., a proposed scheduler).

In the simulation, a 40 MHz bandwidth with a subcarrier spacing of 30 kHz is assumed. In addition, it is assumed that UEs move within a cell at an average speed of 30 km/h. Also, M/M/1 queueing models for traffic pattern is used. Detailed simulation settings are listed in Table 1 below.

TABLE 1

<Simulation Parameters>

| Parameters¤ | Values¤ |
|---|---|
| Channel•Model¤ | Rayleigh¤ |
| Subcarrier•Spacing¤ | 30•kHz¤ |
| System•Bandwidth¤ | 40•MHz¤ |
| Pathloss•Model¤ | Cost231-Hata¤ |
| Output•Power¤ | 46•dBm¤ |
| Interfered•Cells¤ | 2¤ |
| Packet•Delay•Threshold•($l_{th}$)¤ | 100•ms¤ |
| Packet•Volume¤ | 1•-•500•kbytes¤ |
| Packer•Request•Interval¤ | 50•-•5000•ms¤ |
| Number•of•UEs¤ | 5•-•50¤ |
| UE•Speed¤ | 30•km/h¤ |
| Simulation•Time¤ | 5•minutes¤ |

A scheduler may be evaluated to have better performance as the number of packet delay violations decreases and the user perceived throughput increases. Thus, a metric for the packet delay violation and a metric for the user perceived throughput may be used for performance evaluation. As shown in Equation (10) below, the user perceived throughput may be measured as a sum of the user perceived throughput over all UEs associated with the cell.

$$\Gamma_{UPT} = \sum_{t} U(t) \tag{10}$$

where U(t) denotes the user perceived throughput for all UEs at time t. Therefore, $\Gamma_{UPT}$ may represent the total user perceived throughputs accumulated over cumulative time.

In addition, the number of packet delay violations may be aggregated as the number of packet delay violations over all UEs and time, as shown in Equation (11) below:

$$\Gamma_{PacketDelayViolation} = \sum_{t}\sum_{n} \xi_n(t) \tag{11}$$

where $\xi_n$(t) denotes the number of packet delay violations for the n-th UE at time slot t. Thus, $\Gamma_{PacketDelayViolation}$ may represent the number of packet delay violations aggregated over all the UEs and time.

A neural network model used by the proposed scheduler may be trained as described below. The neural network model may be trained for 20 epochs for each training scenario. Each epoch may include 50 time steps (i.e., time sections) or horizons, and at the end of each epoch, the scenario may be reset. TensorFlow may be used as an auto-gradient framework, and i9-9900k CPU may be used for a simulation instance. In addition, a CPU cluster may perform five (5) parallel simulations to generate simulation results. In one embodiment, RTX-2080TI (an example of GPU or a graphic card) may be used. Detailed reinforcement learning simulation settings are listed in Table 2 below.

TABLE 2

<Reinforcement: Learning Simulation Parameters>

| Parameters¤ | Values¤ |
|---|---|
| Number•of•Episodes¤ | 1000¤ |
| Number•of•Steps•Per•Episode¤ | 300¤ |
| Discount•Factor¤ | 0.99¤ |
| Value•Coefficient¤ | 0.1¤ |
| Entropy•Coefficient¤ | 0.01¤ |
| Epochs¤ | 20¤ |
| Clip•Range¤ | 0.2¤ |
| Horizons¤ | 50¤ |
| Learning•Rate¤ | 0.001¤ |

The above-described settings for performance evaluation may also be applied to embodiments shown in FIGS. 9 and 10A to 10C. Thus, the simulation settings and reinforcement learning simulation settings for performance evaluation are not described below in descriptions with respect to FIGS. 9 and 10A to 10C.

FIG. 8A is a graph illustrating performances for the user perceived throughput of a max-throughput scheduler, a proportional-fair(ness) scheduler, a max-fairness scheduler, and the proposed scheduler (i.e., the proposed method) with respect to the number of UEs. FIG. 8B is a graph illustrating performance for packet delay violation of the max-throughput scheduler, the proportional-fair scheduler, the max-fairness scheduler, and the proposed scheduler with respect to the number of UEs.

The max-throughput scheduler is a scheduler that allocates resources to a UE with a highest channel condition (i.e., a UE with a best channel state). The max-fairness scheduler is a scheduler that attempts to maximize the throughput of a UE experiencing a lowest throughput. The proportional-fair scheduler is a scheduler that balances the max-throughput scheduler and the max-fairness scheduler by simultaneously taking into account an achieved throughput and a currently achievable throughput of each UE.

Referring to FIGS. 8A and 8B, the max-throughput scheduler achieves a maximum throughput while showing highest number of packet delay violations. Because the max-throughput scheduler selects only one UE with the best channel state, the number of packet delay violations tends to increase exponentially as the number of UEs increases. For the max-fairness scheduler, it achieves a lowest throughput while showing second highest number of packet delay violations. This is because the max-fairness scheduler allocates a large amount of resources to UEs with poor channel conditions, resulting in a shortage of the total amount of resources for all UEs.

Referring to FIGS. 8A and 8B, the proposed scheduler achieves throughput similar to that of the proportional-fair scheduler while showing lowest packet delay violation. Because the proposed scheduler adjusts the scheduling parameters (e.g., α, β, and γ), the proposed scheduler may adapt to a network condition by taking into account the expected outcomes. That is, the proposed scheduler may be adaptive to network conditions. In addition, the proposed scheduler may predict a distribution of channel conditions to achieve long-term optimal results. Therefore, the proposed scheduler may adaptively operate with respect to a GPF algorithm to achieve the best results in terms of the user perceived throughput and the packet delay violation.

Figure 9:
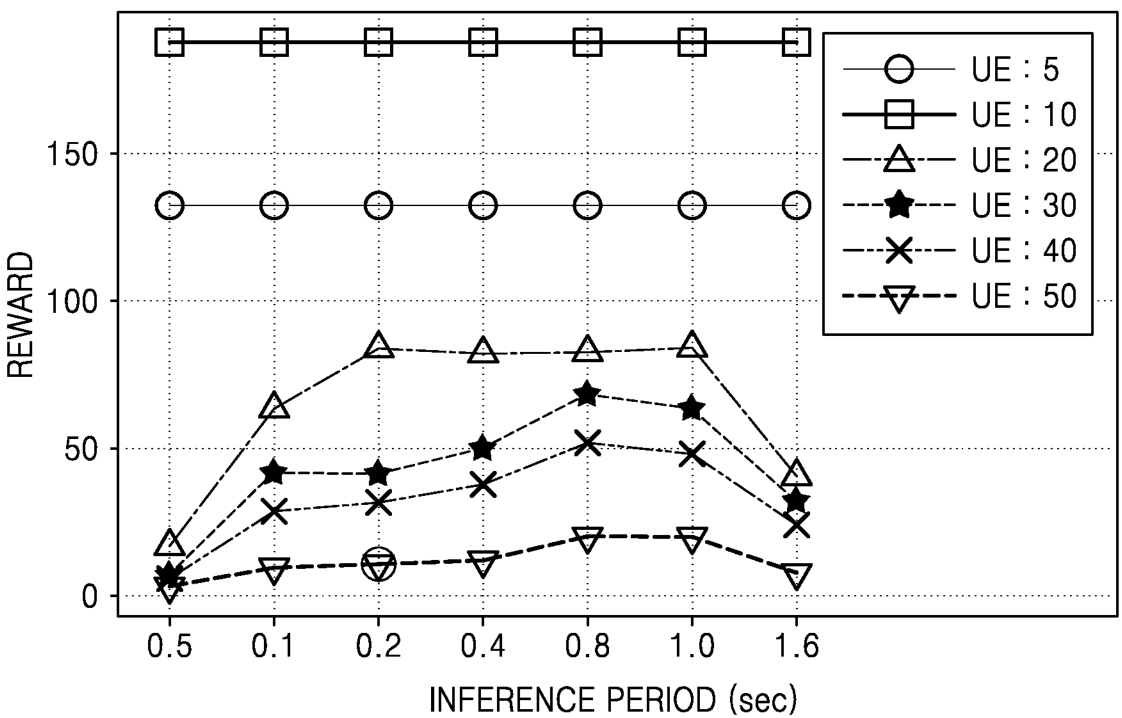
FIG. 9 is a graph illustrating an effect of an inference period on rewards according to an embodiment of the disclosure.

FIG. 9 is a graph illustrating an effect of an inference period on rewards according to an embodiment of the disclosure.

For each scenario, a neural network model for the proposed scheduler may be trained for each inference period within a range between 0.05 sec and 1.6 sec (0.05 sec, 0.1 sec, 0.2 sec, 0.4 sec, 0.8 sec, 1.0 sec, and 1.6 sec). FIG. 9 is a graph illustrating evaluation of performance of a model trained for each inference period. Here, an inference period may be a heatmap generation period.

Referring to FIG. 9, when the number of UEs is 50, an inference period of 0.8 sec exhibits the best performance. On the other hand, when the number of UEs is 5 and 10, an inference period does not show a significant difference in the performance. As illustrated in FIG. 9, when the number of UEs is small, the inference period of 0.8 sec may be sufficiently long to derive statistical characteristics of the network by using a 3D heatmap. Practically, computation power required for inference may be taken into account when determining an inference period. The inference period of 0.8 sec requires an inference delay of 0.8 Hz, which may be achieved by a CPU-based system. Therefore, in an embodiment of the disclosure, the inference period may be set to 0.8 sec, but is not limited thereto.

Inference periods and the number of UEs shown in the graph of FIG. 9 are examples for performance evaluation, but are not limited thereto. That is, the graph of FIG. 9 shows inference periods within a range of 0.05 sec to 1.6 sec, the disclosure is not limited thereto, and the electronic device may operate with a different inference period. In addition, the graph of FIG. 9 shows 5, 10, 20, 30, 40, and 50 UEs, the disclosure is not limited thereto.

Figure 10A:
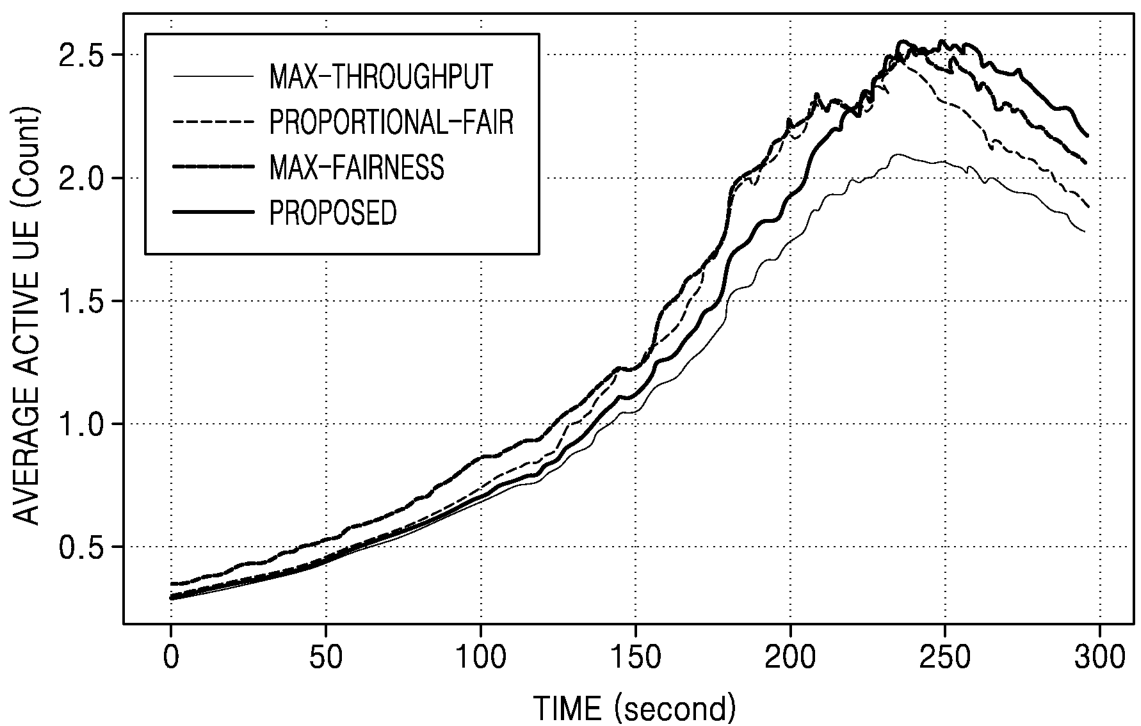
FIG. 10A is a graph illustrating performance of scheduling by each scheduler, according to an embodiment of the disclosure.
Figure 10B:
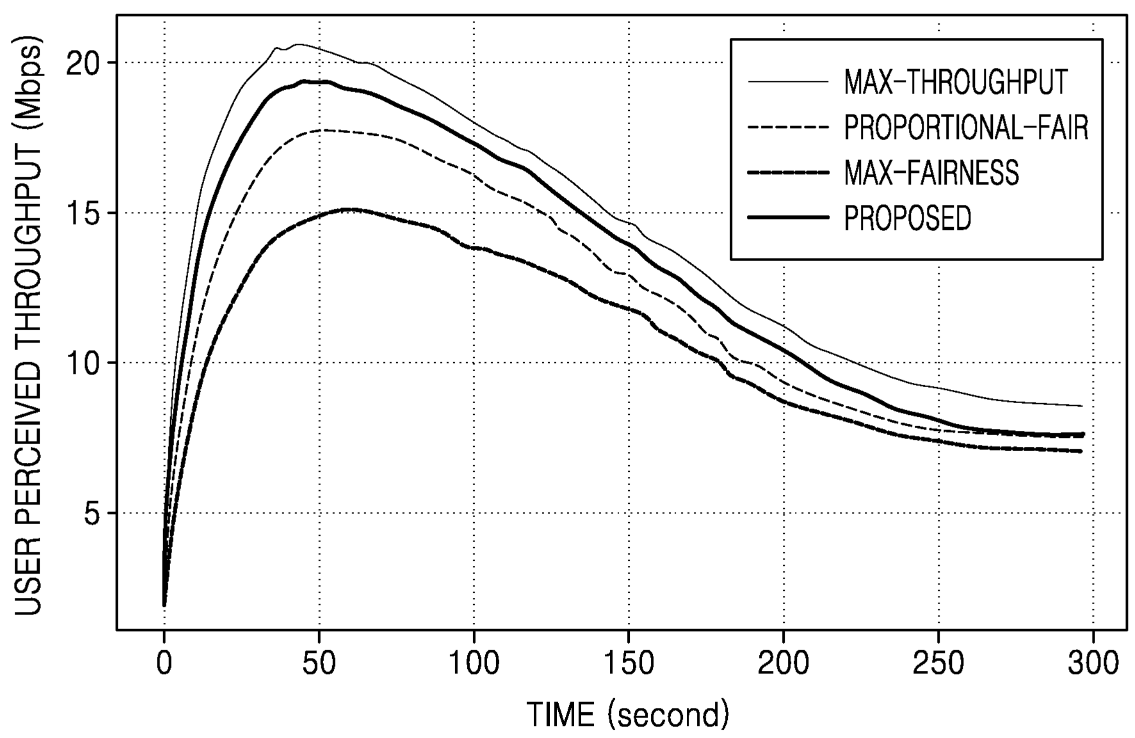
FIG. 10B is a graph illustrating performance of scheduling by each scheduler, according to an embodiment of the disclosure.
Figure 10C:
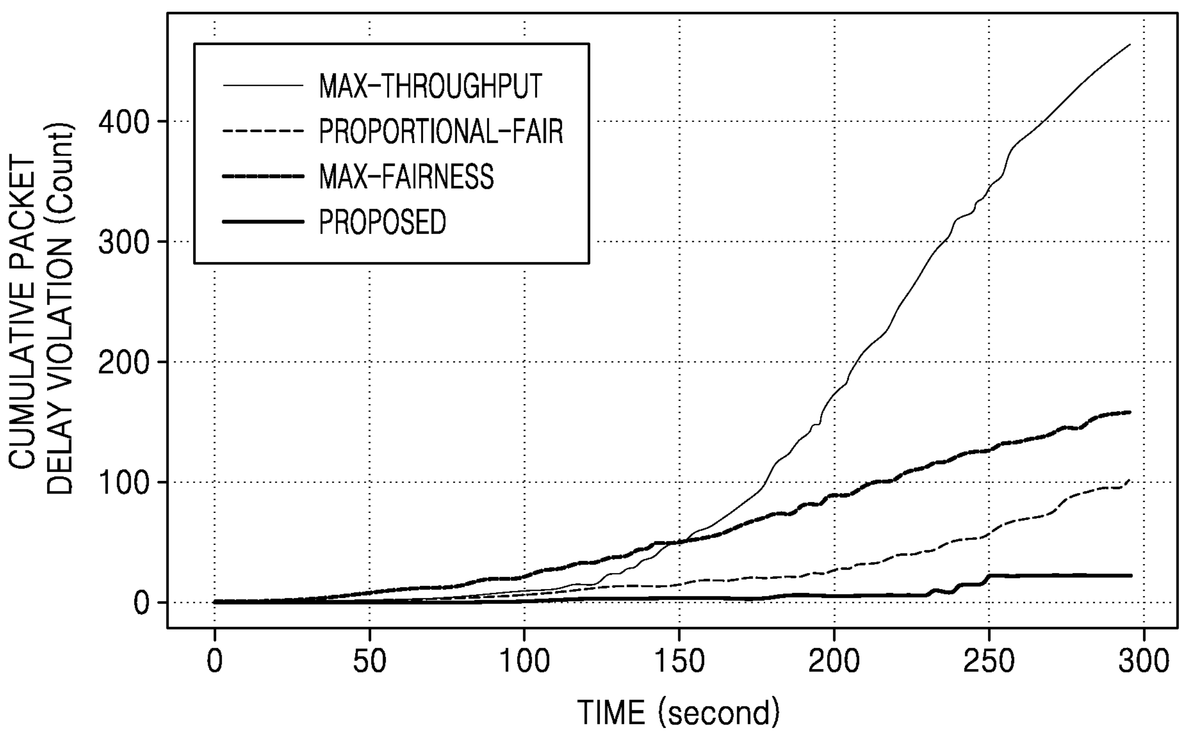
FIG. 10C is a graph illustrating performance of scheduling by each scheduler, according to an embodiment of the disclosure.

FIG. 10A is a graph illustrating performance of scheduling by each scheduler according to an embodiment of the disclosure. FIG. 10B is a graph illustrating performance of scheduling by each scheduler according to an embodiment of the disclosure. FIG. 10C is a graph illustrating performance of scheduling by each scheduler according to an embodiment of the disclosure.

The graphs shown in FIGS. 10A to 10C show performance over time. In detail, FIGS. 10A to 10C show per-second performance of each scheduler for 50 UE scenarios. Network conditions may change from moment to moment due to traffic patterns and a non-stationary channel status. Referring to FIG. 10A, each scheduler may change the number of active UEs. Furthermore, referring to FIG. 10A, the proposed scheduler may maintain a higher value than the proportional-fair scheduler at all times.

Referring to FIG. 10B, the proposed scheduler achieves a lower user perceived throughput than the max-throughput scheduler. On the other hand, the proposed scheduler achieves a higher user perceived throughput than the proportional-fair scheduler and the max-fairness scheduler.

As the number of active UEs and usage of physical RBs (PRBs) increase, a heuristic scheduler may not satisfy the packet delay constraints (i.e., packet delay conditions). In particular, referring to FIG. 10C, for the max-throughput scheduler, the number of packet delay violations may increase exponentially. That is, as shown in FIG. 10B, the max-throughput scheduler that achieves the highest user perceived throughput has poor performance in terms of packet delay violation. On the other hand, because the proposed scheduler is adaptive to network conditions, it may achieve a lowest packet delay violation while achieving a second highest user perceived throughput.

As described above with reference to FIGS. 8A, 8B, and 10A to 10C, the proposed scheduler (i.e., the scheduler according to an embodiment of the disclosure) has improved performance compared to other existing schedulers. Because of its adaptability to various network conditions, the proposed scheduler may be practically useful in a real network environment.

Figure 11:
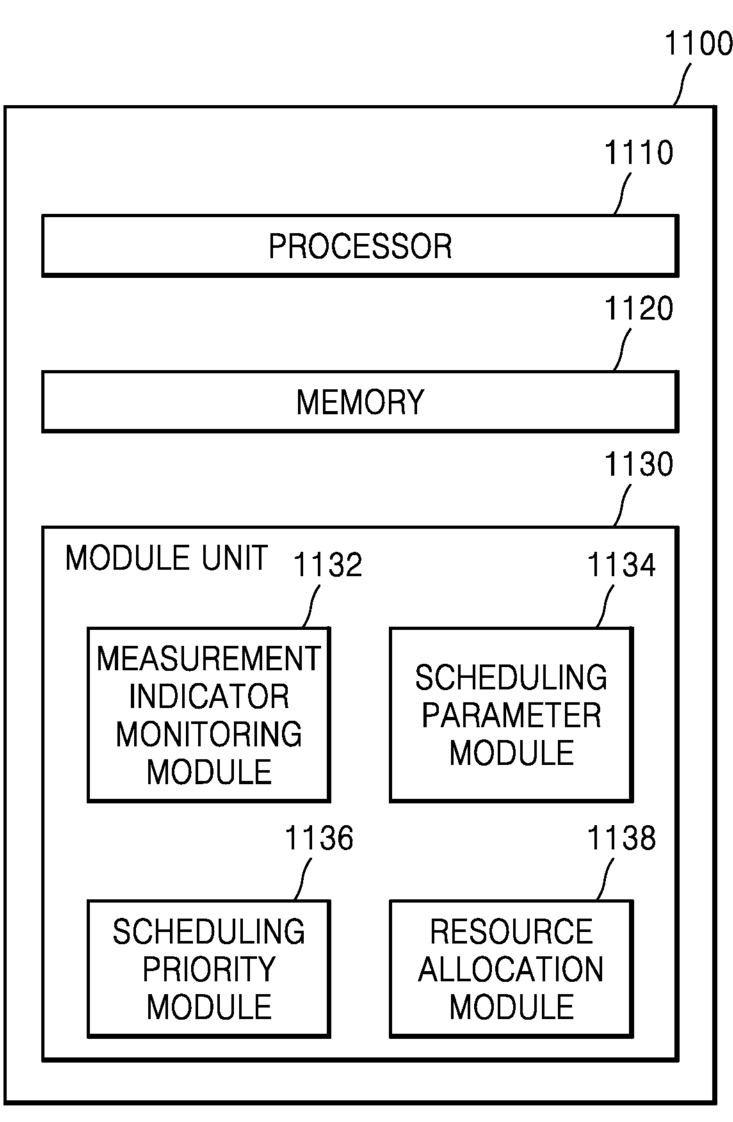
FIG. 11 illustrates a block diagram of an electronic device for determining a scheduling priority, according to an embodiment of the disclosure.

FIG. 11 is a block diagram of an electronic device for determining a scheduling priority, according to an embodiment of the disclosure.

Referring to FIG. 11, an electronic device 1100 (e.g., the base station 110 of FIG. 1) may include at least one processor 1110, a memory 1120, and a module unit 1130. In an embodiment of the disclosure, the module unit 1130 may include a measurement indicator monitoring module 1132, a scheduling parameter module 1134, a scheduling priority module 1136, and a resource allocation module 1138. In one and more embodiments of the disclosure, the electronic device 1100 is not limited to that illustrated in FIG. 11, and may not include at least one of the components illustrated in FIG. 11 or may further include other component. According to one and more embodiments of the disclosure, the electronic device 1100 may include one of digital unit (DU) base station equipment, an X86-based DU emulator, a system level simulator, and a virtualized radio access network (vRAN) processing module.

According to an embodiment of the disclosure, the modules included in the module unit 1130 are not limited to those shown in FIG. 11. For example, at least some of the modules shown in FIG. 11 may be represented by another module, the modules shown in FIG. 11 may be represented by a plurality of other modules, and other modules may be additionally included in the module unit 1130.

In an embodiment of the disclosure, FIG. 11 shows that the measurement indicator monitoring module 1132, the scheduling parameter module 1134, the scheduling priority module 1136, and the resource allocation module 1138 are included in the module unit 1130 of FIG. 11. At least some of the plurality of modules may be implemented as software modules stored in the memory 1120. For example, at least one of the measurement indicator monitoring module 1132, the scheduling parameter module 1134, the scheduling priority module 1136, or the resource allocation module 1138 is not implemented as a separate hardware module, but may be stored in the memory 1120 as a software module and executed by the processor 1110 for operation.

The processor 1110 may be electrically connected to components included in the electronic device 1100 to perform computations or data processing related to control and/or communication of the components included in the electronic device 1100. In an embodiment of the disclosure, the processor 1110 may load a request, a command, or data received from at least one of the other components into the memory 1120 for processing, and store the resultant data in the memory 1120. According to one and more embodiments of the disclosure, the processor 1410 may include at least one of a central processing unit (CPU), an application processor (AP), a GPU, or a neural processing unit (NPU).

The memory 1120 is electrically connected to the processor 1110 and may store one or more modules, programs, instructions, or data related to operations of components included in the electronic device 1100. The memory 2300 may include at least one type of storage medium, e.g., at least one of a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disk, or an optical disk.

Referring to FIG. 11, the electronic device 1100 may receive data from a plurality of UEs (e.g., 120 of FIG. 1), process the received data, and transmit the processed data to the plurality of UEs. For example, the electronic device 1100 may receive, from a plurality of UEs, a request for resource (e.g., radio resource) allocation for tasks performed by the plurality of UEs. Additionally or alternatively, the electronic device 1100 may schedule the tasks based on a specified algorithm in response to the request for resource allocation, and allocate resources to the plurality of UEs based on an order of the scheduled tasks.

The measurement indicator monitoring module 1132 may be executed by the processor 1110 to monitor measurement indicator data for a plurality of UEs. For example, the measurement indicator monitoring module 1132 may periodically monitor and identify at least one of BO, an average throughput, or an MCS index for each of the plurality of UEs. The measurement indicators for the plurality of UEs may be used to determine scheduling priorities for the plurality of UEs.

The scheduling parameter module 1134 may be executed by the processor 1110 to calculate a value of a scheduling parameter required to determine a scheduling priority. For example, the scheduling parameter may be a parameter associated with any one scheduling method among proportional-fair scheduling, round-robin, and max carrier-to-interference (C/I). In an embodiment of the disclosure, the scheduling parameter module 1134 may calculate scheduling parameters based on measurement indicator data for a plurality of UEs by using at least one neural network model. To achieve this, in addition, the scheduling parameter module 1134 may generate a heatmap based on measurement indicators of a plurality of UEs. The at least one neural network model may be stored in the memory 1120, or loaded into the memory 1120 from an external storage device and used.

The scheduling priority module 1136 may be executed by the processor 1110 to determine scheduling priorities for a plurality of active UEs. For example, the scheduling priority module 1136 may determine priorities of a plurality of packets respectively corresponding to the plurality of active UEs. In an embodiment of the disclosure, the scheduling priority module 1136 may determine scheduling priorities for a plurality of active UEs based on scheduling parameters. In one and more embodiments of the disclosure, the scheduling priority module 1136 may determine the priorities of the plurality of packets by using any one scheduling method from among proportional-fair scheduling, round-robin, and max C/I.

The resource allocation module 1138 may be executed by the processor 1110 to allocate resources to at least some of the plurality of active UEs based on the scheduling priorities for the plurality of active UEs. For example, the resource allocation module 1138 may allocate radio resources to at least some of the plurality of packets based on the scheduling priorities.

The embodiments described above with reference to any of FIGS. 1 to 11 may also be applied in other figures, and descriptions thereof already provided above may be omitted. Also, the embodiments described with reference to FIGS. 1 to 11 may be combined with one another.

A computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium. For example, the 'non-transitory storage medium' may include a buffer in which data is temporarily stored.

Furthermore, programs according to embodiments disclosed in the present specification may be included in a computer program product when provided. The computer program product may be traded, as a product, between a seller and a buyer. For example, the computer program product may be distributed in the form of a computer-readable storage medium (e.g., compact disc ROM (CD-ROM)) or distributed (e.g., downloaded or uploaded) online via an application store (e.g., Google Play Store™) or directly between two user devices (e.g., smartphones). For online distribution, at least a part of the computer program product (e.g., a downloadable app) may be at least transiently stored or temporally created on a computer-readable storage medium such as a server of a manufacturer, a server of an application store, or a memory of a relay server.

A method, performed by an electronic device, of determining a scheduling priority of a UE, according to an embodiment of the disclosure, may include identifying one or more measurement indicators for a first UE associated with (e.g., communicating with) the electronic device in a first time section. In an embodiment of the disclosure, the method may include generating a first heatmap for the first time section, based on the one or more measurement indicators for the first UE. In an embodiment of the disclosure, the method may include calculating one or more scheduling parameters based on the first heatmap by using at least one neural network model. In an embodiment of the disclosure, the method may include determining, based on the one or more scheduling parameters, scheduling priorities for one or more UEs.

In an embodiment of the disclosure, the method may include identifying one or more measurement indicators for a second UE associated with (e.g., communicating with) the electronic device in a second time section. In an embodiment of the disclosure, the method may include generating a second heatmap for the second time section, based on the one or more measurement indicators of the second UE. In an embodiment of the disclosure, the calculating of the one or more scheduling parameters may include calculating, by using the at least one neural network model, the one or more scheduling parameters based on a plurality of heatmaps respectively generated for a plurality of time sections. In an embodiment of the disclosure, the plurality of time sections may include the first time section and the second time section. In an embodiment of the disclosure, the plurality of heatmaps may include the first heatmap and the second heat map.

In an embodiment of the disclosure, the at least one neural network model may include a first sub-model and a second sub-model. In an embodiment of the disclosure, the calculating of the one or more scheduling parameters based on the plurality of heatmaps respectively generated for the plurality of time sections may include extracting a plurality of features from the plurality of heatmaps by using the first sub-model. In an embodiment of the disclosure, the calculating of the one or more scheduling parameters based on the plurality of heatmaps respectively generated for the plurality of time sections may include deriving a plurality of time-dependent features based on the plurality of features by using the second sub-model. In an embodiment of the disclosure, the calculating of the one or more scheduling parameters based on the plurality of heatmaps respectively generated for the plurality of time sections may include calculating the one or more scheduling parameters based on the plurality of time-dependent features.

In an embodiment of the disclosure, the plurality of time sections may include sequential time sections. In an embodiment of the disclosure, a number of the plurality of heatmaps may be determined based on at least one of an environmental factor or a configuration value associated with the electronic device.

In an embodiment of the disclosure, a length of the first time section may be determined based on the at least one of the environmental factor or the configuration value associated with the electronic device.

In an embodiment of the disclosure, a dimension of the first heatmap may correspond to the number of the one or more measurement indicators. In an embodiment of the disclosure, a size of the first heatmap may be determined based on a minimum value and a maximum value of each of the one or more measurement indicators. In an embodiment of the disclosure, at least one of the minimum value or the maximum value of each of the one or more measurement indicators may be determined according to (or based on) the configuration value for (or associated with) the electronic device.

In an embodiment of the disclosure, the one or more measurement indicators may include at least one of BO, an average throughput, or an MCS index. In an embodiment of the disclosure, the one or more scheduling parameters may include one or more variables for a GPF metric.

In an embodiment of the disclosure, the at least one neural network model may be a model trained via reinforcement learning to infer the one or more scheduling parameters. In one embodiment, the trained neural network model may be used to infer the one or more scheduling parameters. In an embodiment of the disclosure, a state variable for the reinforcement learning may include the one or more measurement indicators. In an embodiment of the disclosure, an action variable for the reinforcement learning may include the one or more scheduling parameters. In an embodiment of the disclosure, a reward variable for the reinforcement learning may include an user perceived throughput and a packet delay violation.

In an embodiment of the disclosure, the one or more UEs may be active UEs associated with (e.g., communicating with) the electronic device and resources may be assigned to the one or more UEs, based on the scheduling priorities for the one or more UEs.

An electronic device for determining a scheduling priority of a UE, according to an embodiment of the disclosure, may include a memory storing one or more instructions and at least one processor configured to execute the one or more instructions stored in the memory. In an embodiment of the disclosure, the at least one processor may be configured to execute the one or more instructions to identify one or more measurement indicators for a first UE associated with (e.g., communicating with) the electronic device in a first time section. In an embodiment of the disclosure, the at least one processor may be configured to execute the one or more instructions to generate a first heatmap for the first time section, based on the one or more measurement indicators for the first UE. In an embodiment of the disclosure, the at least one processor may be configured to execute the one or more instructions to calculate one or more scheduling parameters based on the first heatmap by using at least one neural network model. In an embodiment of the disclosure, the at least one processor may be configured to execute the one or more instructions to determine, based on the one or more scheduling parameters, scheduling priorities for one or more UEs.

In an embodiment of the disclosure, the at least one processor may be further configured to execute the one or more instructions to identify one or more measurement indicators for a second UE associated with (e.g., communicating with) the electronic device in a second time section. In an embodiment of the disclosure, the at least one processor may be further configured to execute the one or more instructions to generate a second heatmap for the second time section, based on the one or more measurement indicators for the second UE. In an embodiment of the disclosure, the at least one processor may be further configured to execute the one or more instructions to calculate, by using the at least one neural network model, the one or more scheduling parameters based on a plurality of heatmaps respectively generated for a plurality of time sections. In an embodiment of the disclosure, the plurality of time sections may include the first time section and the second time section. In an embodiment of the disclosure, the plurality of heatmaps may include the first heatmap and the second heat map.

In an embodiment of the disclosure, the at least one neural network model may include a first sub-model and a second sub-model. In an embodiment of the disclosure, the at least one processor may be further configured to execute the one or more instructions to extract a plurality of features from the plurality of heatmaps by using the first sub-model. In an embodiment of the disclosure, the at least one processor may be further configured to execute the one or more instructions to derive a plurality of time-dependent features based on the plurality of features by using the second sub-model. In an embodiment of the disclosure, the at least one processor may be further configured to execute the one or more instructions to calculate the one or more scheduling parameters based on the plurality of time-dependent features.

In an embodiment of the disclosure, the plurality of time sections may include sequential time sections. In an embodiment of the disclosure, a number of the plurality of heatmaps may be determined based on at least one of an environmental factor or a configuration value associated with the electronic device.

In an embodiment of the disclosure, a length of the first time section may be determined based on the at least one of the environmental factor or the configuration value associated with the electronic device.

In an embodiment of the disclosure, a dimension of the first heatmap may correspond to a number of the one or more measurement indicators. In an embodiment of the disclosure, a size of the first heatmap may be determined based on a minimum value and a maximum value of each of the one or more measurement indicators. In an embodiment of the disclosure, at least one of the minimum value or the maximum value of each of the one or more measurement indicators may be determined according to (or based on) the configuration value for (or associated with) the electronic device.

In an embodiment of the disclosure, the one or more measurement indicators may include at least one of BO, an average throughput, or an MCS index. In an embodiment of the disclosure, the one or more scheduling parameters may include one or more variables for a GPF metric.

In an embodiment of the disclosure, the at least one neural network model may be trained via reinforcement learning to infer the one or more scheduling parameters. In one embodiment, the trained neural network model may be used to infer the one or more scheduling parameters. In an embodiment of the disclosure, a state variable for the reinforcement learning may include the one or more measurement indicators. In an embodiment of the disclosure, an action variable for the reinforcement learning may include the one or more scheduling parameters. In an embodiment of the disclosure, a reward variable for the reinforcement learning may include an user perceived throughput and a packet delay violation.

A program for performing, on a computer, a method of determining a scheduling priority of a UE, according to an embodiment of the disclosure, may be recorded on a computer-readable recording medium.

What is claimed is:

1. A method, performed by an electronic device, the method comprising:

obtaining values of measurement indicators for first user equipments (UEs) connected with a base station in a first time section;

generating a first heatmap corresponding to the first time section, based on the values of the measurement indicators for the first UEs, wherein a dimension of the first heatmap corresponds to a number of the measurement indicators, each axis of the first heatmap corresponds to one of the measurement indicators, and the first heatmap represents a number of UEs corresponding to each combination of values of the measurement indicators; and obtaining one or more scheduling parameters by providing the first heatmap to at least one neural network model, wherein the one or more scheduling parameters are used for determining scheduling priorities of one or more UEs, wherein a size of the first heatmap is determined based on a minimum value and a maximum value of each of the measurement indicators, and wherein at least one of the minimum value or the maximum value of each of the measurement indicators is determined based on configuration information associated with the base station.

2. The method of claim 1, further comprising:

obtaining values of measurement indicators for second UEs connected with the base station in a second time section; and generating a second heatmap corresponding to the second time section, based on the values of the measurement indicators for the second UEs, wherein the obtaining of the one or more scheduling parameters comprises calculating, by using the at least one neural network model, the one or more scheduling parameters based on a plurality of heatmaps corresponding to a plurality of time sections, wherein the plurality of time sections comprises the first time section and the second time section, and wherein the plurality of heatmaps comprises the first heatmap and the second heatmap.

3. The method of claim 2, wherein the at least one neural network model comprises a first sub-model and a second sub-model, and wherein the calculating of the one or more scheduling parameters based on the plurality of heatmaps corresponding to the plurality of time sections comprises:

extracting a plurality of features from the plurality of heatmaps by using the first sub-model;

deriving a plurality of time-dependent features based on the plurality of features by using the second sub-model; and calculating the one or more scheduling parameters, based on the plurality of time-dependent features.

4. The method of claim 2, wherein the plurality of time sections comprise sequential time sections, and wherein a number of the plurality of heatmaps is determined based on at least one of an environmental factor or the configuration information value associated with the base station.

5. The method of claim 1, wherein a length of the first time section is determined based on the at least one of an environmental factor or the configuration information value associated with the base station.

6. The method of claim 1, wherein the measurement indicators comprise at least one of buffer occupancy, an average throughput, or a modulation and coding scheme (MCS) index, and wherein the one or more scheduling parameters comprise one or more variables for a generalized proportional fairness (GPF) metric.

7. The method of claim 1, wherein the at least one neural network model is trained via a reinforcement learning and infers the one or more scheduling parameters.

8. The method of claim 7, wherein a state variable for the reinforcement learning comprises the measurement indicators, wherein an action variable for the reinforcement learning comprises the one or more scheduling parameters, and wherein a reward variable for the reinforcement learning comprises a user perceived throughput and a packet delay violation.

9. The method of claim 1, wherein the one or more UEs are active UEs connected with the base station and resources are assigned to the one or more UEs, based on the scheduling priorities of the one or more UEs.

10. An electronic device comprising:

a memory storing one or more instructions; and at least one processor configured to execute the one or more instructions stored in the memory to:

obtain values of measurement indicators for first user equipments (UEs) connected with a base station in a first time section, generate a first heatmap corresponding to the first time section, based on the values of the measurement indicators for the first UEs, wherein a dimension of the first heatmap corresponds to a number of the measurement indicators, each axis of the first heatmap corresponds to one of the measurement indicators, and the first heatmap represents a number of UEs corresponding to each combination of values of the measurement indicators, and obtain one or more scheduling parameters by providing the first heatmap to at least one neural network model, wherein the one or more scheduling parameters are used for determining scheduling priorities of one or more UEs, wherein a size of the first heatmap is determined based on a minimum value and a maximum value of each of the measurement indicators, and wherein at least one of the minimum value or the maximum value of each of the measurement indicators is determined based on configuration information associated with the base station.

11. The electronic device of claim 10, wherein the at least one processor is further configured to execute the one or more instructions to:

obtain values of measurement indicators for second UEs connected with the base station in a second time section, generate a second heatmap corresponding to the second time section, based on the values of the measurement indicators for the second UEs, and calculate, by using the at least one neural network model, the one or more scheduling parameters based on a plurality of heatmaps corresponding to a plurality of time sections, and wherein the plurality of time sections comprises the first time section and the second time section, and wherein the plurality of heatmaps comprises the first heatmap and the second heatmap.

12. The electronic device of claim 11, wherein the at least one neural network model comprises a first sub-model and a second sub-model, and wherein the at least one processor is further configured to execute the one or more instructions to:

extract a plurality of features from the plurality of heatmaps by using the first sub-model, derive a plurality of time-dependent features based on the plurality of features by using the second sub-model, and calculate the one or more scheduling parameters based on the plurality of time-dependent features.

13. The electronic device of claim 11, wherein the plurality of time sections comprises sequential time sections, and wherein a number of the plurality of heatmaps is determined based on at least one of an environmental factor or the configuration information value associated with the base station.

14. The electronic device of claim 10, wherein a length of the first time section is determined based on the at least one of an environmental factor or the configuration information value associated with the base station.

15. The electronic device of claim 10, wherein the measurement indicators comprise at least one of buffer occupancy, an average throughput, or a modulation and coding scheme (MCS) index, and wherein the one or more scheduling parameters comprise one or more variables for a generalized proportional fairness (GPF) metric.

16. The electronic device of claim 10, wherein the at least one neural network model is trained via a reinforcement learning and infers the one or more scheduling parameters.

17. The electronic device of claim 16, wherein a state variable for the reinforcement learning comprises the measurement indicators, wherein an action variable for the reinforcement learning comprises the one or more scheduling parameters, and wherein a reward variable for the reinforcement learning comprises a user perceived throughput and a packet delay violation.

18. A non-transitory computer-readable storage medium having stored thereon a program for performing the method of claim 1 on a computer.

* * * * *